United States Patent
Jeong et al.

(10) Patent No.: US 9,684,818 B2
(45) Date of Patent: Jun. 20, 2017

(54) METHOD AND APPARATUS FOR PROVIDING IMAGE CONTENTS

(71) Applicant: SAMSUNG ELECTRONICS CO., LTD., Suwon-si, Gyeonggi-do (KR)

(72) Inventors: Soon-mook Jeong, Yongin-si (KR); Ji-hong Kang, Seoul (KR); Jae-min Soh, Suwon-si (KR); Ji-hyo Lee, Suwon-si (KR); Jin-wuk Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/819,897

(22) Filed: Aug. 6, 2015

(65) Prior Publication Data

US 2016/0048723 A1    Feb. 18, 2016

(30) Foreign Application Priority Data

Aug. 14, 2014  (KR) .................. 10-2014-0105799
Apr. 17, 2015  (KR) .................. 10-2015-0054757

(51) Int. Cl.
*G06K 9/48*   (2006.01)
*G06K 9/00*   (2006.01)
(Continued)

(52) U.S. Cl.
CPC ... *G06K 9/00268* (2013.01); *G06F 17/30793* (2013.01); *G06K 9/00288* (2013.01);
(Continued)

(58) Field of Classification Search
CPC . G06F 17/30793; G06T 7/0081; G11B 27/28; G06K 9/4642; G06K 9/00268;
(Continued)

(56) References Cited

U.S. PATENT DOCUMENTS 6,546,185 B1    4/2003  Kim et al.
6,690,814 B1 *  2/2004  Yuasa ................ G06K 9/00228
                                                         382/118
(Continued)

FOREIGN PATENT DOCUMENTS

EP    2 530 675       12/2012
KR    10-0636910      1/2007
(Continued)

OTHER PUBLICATIONS

Computer English Translation of Korean Pat. KR 10-2012-0134936 A, pp. 1-39.*

(Continued)

*Primary Examiner* — Daniel Mariam
(74) *Attorney, Agent, or Firm* — Nixon & Vanderhye P.C.

(57) ABSTRACT

Disclosed herein is a method for providing image contents. The method for providing image contents includes: dividing the image contents into a plurality of scenes, each scene including a plurality of shots; classifying image frames for each scene depending on each of a plurality of characters appearing in the image contents; receiving a user input for selecting any one of the plurality of characters; and displaying a scene corresponding to the character selected depending on the user input.

19 Claims, 32 Drawing Sheets

(51) Int. Cl.
*G06K 9/46* (2006.01)
*G06K 9/62* (2006.01)
*G11B 27/28* (2006.01)
*G06F 17/30* (2006.01)
*G06T 7/11* (2017.01)

(52) U.S. Cl.
CPC ......... *G06K 9/4642* (2013.01); *G06K 9/4652* (2013.01); *G06K 9/481* (2013.01); *G06K 9/6201* (2013.01); *G06T 7/11* (2017.01); *G11B 27/28* (2013.01)

(58) Field of Classification Search
CPC .. G06K 9/00288; G06K 9/4652; G06K 9/481; G06K 9/6201
USPC .................. 382/118, 173, 197, 209, 218, 224
See application file for complete search history.

(56) References Cited

U.S. PATENT DOCUMENTS

| | | | |
|---|---|---|---|
| 8,254,752 | B2 | 8/2012 | Ryu |
| 8,442,268 | B2 * | 5/2013 | Isogai ............... G06F 17/30793 382/103 |
| 8,849,041 | B2 * | 9/2014 | Neumann .......... G06K 9/00765 382/103 |
| 9,436,876 | B1 * | 9/2016 | Carlson ................ G06K 9/6224 |
| 2005/0134946 | A1 | 6/2005 | Tsue et al. |
| 2005/0289448 | A1 | 12/2005 | Megiddo et al. |
| 2006/0251384 | A1 * | 11/2006 | Vronay ................ G11B 27/034 386/242 |
| 2007/0030391 | A1 | 2/2007 | Kim et al. |
| 2008/0292279 | A1 | 11/2008 | Kamada et al. |
| 2009/0103887 | A1 | 4/2009 | Choi et al. |
| 2009/0172030 | A1 | 7/2009 | Schiff et al. |
| 2012/0148118 | A1 | 6/2012 | Lee et al. |
| 2013/0259327 | A1 | 10/2013 | Cheswick |

FOREIGN PATENT DOCUMENTS

| | | |
|---|---|---|
| KR | 10-0792016 | 1/2008 |
| KR | 10-0827846 | 5/2008 |
| KR | 10-2012-0064581 | 6/2012 |
| KR | 10-2012-0134936 | 12/2012 |
| KR | 2013-0061058 | 6/2013 |
| KR | 10-1382499 | 4/2014 |

OTHER PUBLICATIONS

Search Report mailed Dec. 16, 2015 in counterpart International Patent Application No. PCT/KR2015/008434.
Written Opinion mailed Dec. 16, 2015 in counterpart International Patent Application No. PCT/KR2015/008434.
Extended Search Report mailed Jan. 14, 2016 in counterpart European Patent Application No. 15180068.7.

* cited by examiner

FIG. 3A

| Pixel Color | Color Histogram | Edge | Face IDs |
|---|---|---|---|

IMAGE FEATURE VECTOR

FIG. 3B

| Pixel Color Difference | Color Histogram Difference | Motion/ Edge Difference |
|---|---|---|

IMAGE DIFFERENCE FEATURE VECTOR

FIG. 3C

| Volume | Power | Spectrum |
|---|---|---|

AUDIO FEATURE VECTOR

FIG. 7

| | | Merge Window | | | | | | |
|---|---|---|---|---|---|---|---|---|
| Shot #0 | Shot #1 | Shot #2 | Shot #3 | Shot #4 | Shot #5 | Shot #6 | Shot #7 | Shot #8 |

Window Position #2

COMPARISON OF SIMILARITY BETWEEN SHOTS IN MERGE WINDOW

| Shot #2 | Shot #3 | Shot #4 | Shot #5 | Shot #6 | → No match found with Shot#6 |

| Scene #0 | Scene #1 |

FIG. 8

| Shot #0 | Shot #1 | Shot #2 | Shot #3 | Shot #4 | Shot #5 | Shot #6 | Shot #7 | Shot #8 |
|---|---|---|---|---|---|---|---|---|

Merge Window covers Shot #3 through Shot #7

Window Position #3

COMPARISON OF SIMILARITY BETWEEN SHOTS IN MERGE WINDOW

| Shot #3 | Shot #4 | Shot #5 | Shot #6 | Shot #7 |
|---|---|---|---|---|

→ No match found with Shot#7

| Scene #0 | Scene #1 | Scene #2 |
|---|---|---|

FIG. 16

FIG. 27A
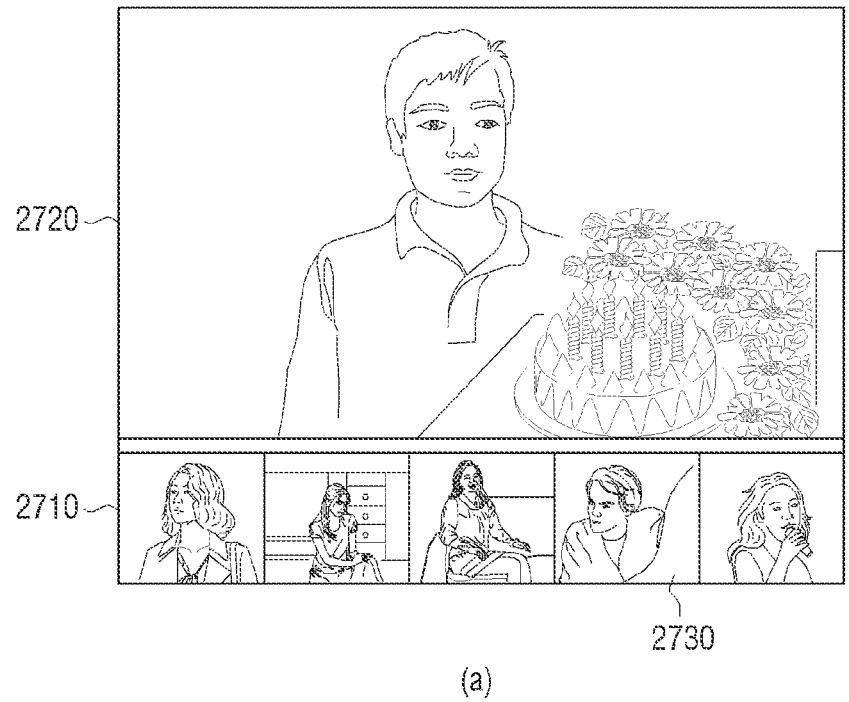
(a)
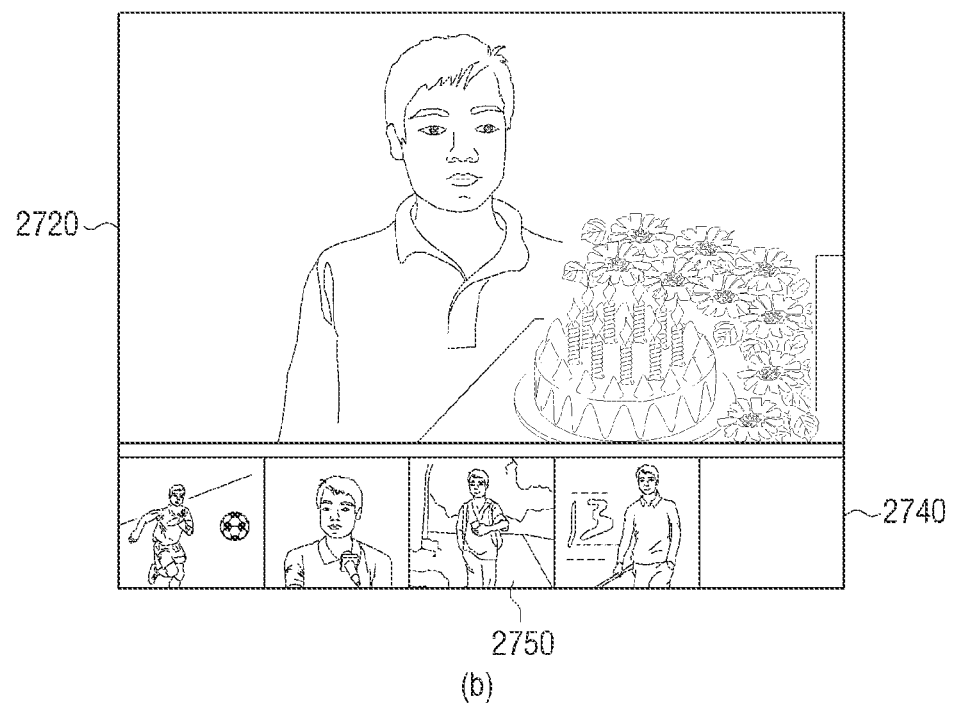
(b)

FIG. 27B
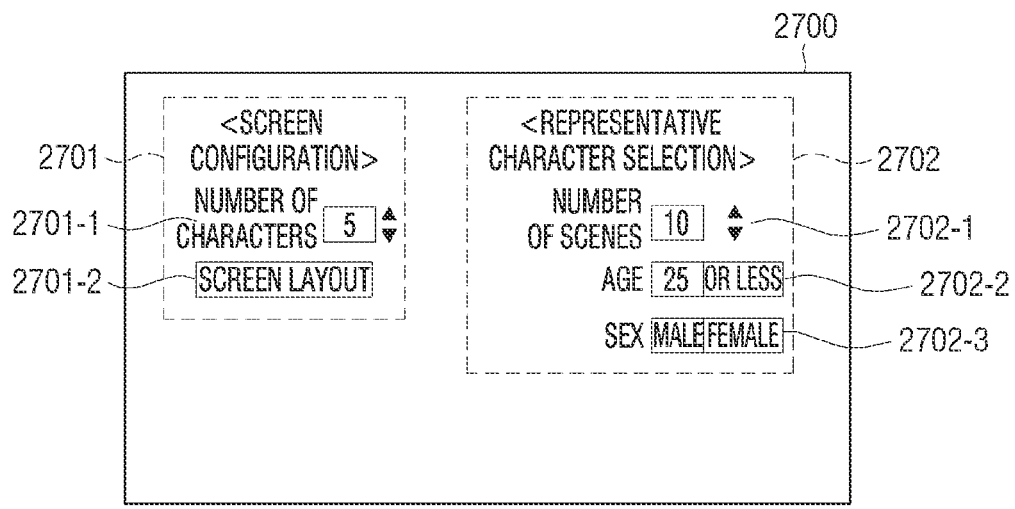
(a)
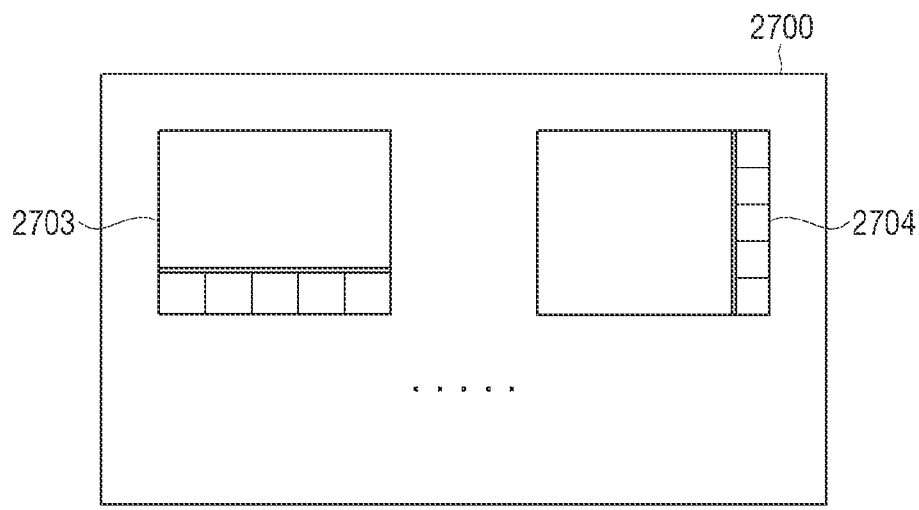
(b)

METHOD AND APPARATUS FOR PROVIDING IMAGE CONTENTS

CROSS-REFERENCE TO RELATED APPLICATIONS

This application is based on and claims priority under 35 U.S.C. §119 to Korean Patent Application No. 10-2015-0054757, filed on Apr. 17, 2015, in the Korean Intellectual Property Office, and Korean Patent Application No. 10-2014-0105799, filed on Aug. 14, 2014, in the Korean Intellectual Property Office, the disclosures of which are incorporated herein by reference in their entireties.

BACKGROUND

Field

The present disclosure relates to a technology for providing image contents, and more particularly, to a method and an apparatus for providing image contents for a character selected by a user.

Description of Related Art

As services of various kinds of image contents are provided through a display apparatus, a technology capable of selectively providing only image contents desired by a user has been developed. Typically, an on-demand type contents service technology for selectively providing image contents in which an actor or an actress desired by the user appears has been commercialized.

However, in order to provide a service further satisfying a user's demand, a technology of editing and displaying only an image in which a specific character desired by the user in single image contents appears has been demanded. Particularly, since a scene of the contents is configured in a context in which the user appreciates the contents, a method for providing an image based on the scene needs to be considered. That is, a technology for dividing the contents based on the scene and effectively providing an image for a character of the contents depending on the divided scenes has been demanded.

SUMMARY

Example embodiments overcome the above disadvantages and other disadvantages not described above.

The present disclosure provides a method and an apparatus for providing image contents capable of dividing contents based on scenes and effectively providing an image for a character of the contents depending on the divided scenes.

According to an example embodiment, a method for providing image contents includes: dividing the image contents into a plurality of scenes including a plurality of shots; classifying image frames for each scene depending on each of a plurality of characters appearing in the image contents; receiving a user input for selecting any one of the plurality of characters; and displaying a scene corresponding to the character selected.

According to another example embodiment, a method for providing image contents includes calculating an image difference feature vector indicating an image difference between adjacent frames; detecting a shot boundary based on the calculated image difference feature vector; dividing the image contents into a plurality of shots based on the detected shot boundary; classifying image frames for each scene depending on each of a plurality of characters appearing in the image contents; receiving a user input for selecting any one of the plurality of characters; and displaying a scene corresponding to the character selected.

In the detecting of the shot boundary, the shot boundary may be detected using a machine studying algorithm.

The dividing of the image contents into the plurality of shots may, for example, include generating shot feature vectors including at least one of shot start time information indicating start time information of each of the plurality of shots, image feature values of a plurality of image frames included in one shot, and audio feature values of the plurality of image frames included in one shot with respect to each of the plurality of shots and grouping the plurality of shots into one scene based on a similarity between the generated shot feature vectors.

In the grouping, in the case in which a similarity between a first shot feature vector and an n-th shot feature vector is greater than or equal to a preset value, all shots from a first shot to an n-th shot may be grouped into the same scene.

According to still another example embodiment, a method for providing image contents includes: dividing the image contents into a plurality of scenes, each scene including a plurality of shots; classifying image frames depending on body information of the image frames included in a first scene when a scene change from the first scene to a second scene is generated; extracting face feature information by analyzing face information of the classified image frame; allocating an ID to the classified image frames based on the extracted face feature information; and generating image section information to which the ID for the first scene is allocated. The method for providing image contents may further include receiving a user input for selecting any one of the plurality of characters; and displaying a scene corresponding to the character selected.

The face feature information may include at least one face feature vector.

In the allocating of the ID, an ID having face feature information matched to the extracted face feature information may be allocated to the classified image frames.

In the classifying of the image frames, the image frames may be classified further using audio information.

According to still another example embodiment, a method for providing image contents includes dividing the image contents into a plurality of scenes, each scene including a plurality of shots; and classifying image frames using image data in which a region corresponding to a background image in an image representing a body of a character is removed in the case in which an image representing a face of the character included in the image frames includes the background image. The method for providing image contents may further include receiving a user input for selecting any one of a plurality of characters; and displaying a scene corresponding to the character selected.

The method for providing image contents may further include generating an image in which the region corresponding to the background image in the image representing the body of the character is removed in the case in which the image representing the face of the character included in the image frames includes the background image, comparing a similarity between the character included in the generated image and a character of an already classified group, and including the generated image in the already classified group in the case in which the similarity is greater than or equal to a preset value as a comparison result.

In the comparing of the similarity, a color histogram of an image of the character included in the generated image and a color histogram of the character of the already classified group may be compared with each other.

According to still another example embodiment, a method for providing image contents includes: dividing the image contents into a plurality of scenes, each scene including a plurality of shots; classifying image frames for each scene depending on each of a plurality of characters appearing in the image contents; comparing feature values for a scene node included in a character node with feature values for the character node; and deleting the scene node from the character node based on comparing the similarity of the feature values for the scene node and the feature values for the character node. The method for providing image contents may further include receiving a user input for selecting any one of the plurality of characters; and displaying a scene corresponding to the character selected.

According to still another example embodiment, an apparatus for providing image contents includes: a scene configuring unit or circuit for dividing the image contents into a plurality of scenes, each scene including a plurality of shots; a classifying unit or circuit for classifying image frames for each scene depending on each of a plurality of characters appearing in the image contents; an input unit or circuit for receiving a user input for selecting any one of the plurality of characters; and a display unit or circuit for displaying a scene corresponding to the character selected.

The scene configuring unit or circuit may calculate an image difference feature vector indicating an image difference between adjacent frames, detect a shot boundary based on the calculated image difference feature vector, and divide the image contents into the plurality of shots based on the detected shot boundary.

The scene configuring unit or circuit may detect the shot boundary using a machine studying algorithm.

The scene configuring unit or circuit may generate shot feature vectors including at least one of shot start time information indicating start time information of each of the plurality of shots, image feature values of a plurality of image frames included in one shot, and audio feature values of the plurality of image frames included in one shot with respect to each of the plurality of shots and group the plurality of shots into one scene based on a similarity between the generated shot feature vectors.

The scene configuring unit or circuit may group all shots from a first shot to an n-th shot into the same scene in the case in which a similarity between a first shot feature vector and an n-th shot feature vector is greater than or equal to a preset value.

The classifying unit or circuit may include: a body recognizing unit or circuit for classifying the image frames depending on body information of the image frames included in a first scene when a scene change from the first scene to a second scene is generated; a face recognizing unit or circuit for analyzing face information of the classified image frames to extract face feature information; an ID allocating unit or circuit for allocating an ID to the classified image frames based on the extracted face feature information; and an image section information generating unit or circuit for generating image section information to which the ID for the first scene is allocated.

The face feature information may include at least one face feature vector.

BRIEF DESCRIPTION OF THE DRAWINGS

The above and/or other aspects of the example embodiments will become more apparent from the following detailed description taken in conjunction with the following drawings in which like reference numerals refer to like elements, and wherein:

FIGS. 3A to 3C are views illustrating vector information generated as an image analysis result;

FIGS. 5 to 8 are views illustrating a scene grouping method according to an example embodiment;

FIGS. 14 to 16 are views illustrating an image frame classifying process according to an example embodiment;

FIGS. 27A and 27B are views illustrating a character selecting screen and a setting screen according to an example embodiment;

DETAILED DESCRIPTION

Figure 1:
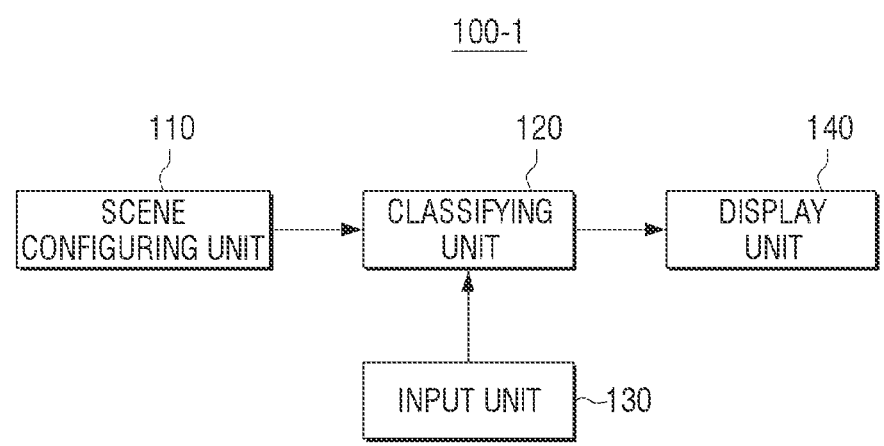
FIG. 1 is a block diagram illustrating a configuration of an apparatus for providing image contents according to an example embodiment.

The example embodiments of the present disclosure may be diversely modified. Accordingly, specific example embodiments are illustrated in the drawings and are described in detail in the detailed description. However, it will be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present disclosure are used to describe the example embodiments, but are not intended to limit the scope of the disclosure. The singular expression also includes the plural meaning as long as it does not conflict with the context. In the present disclosure, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

As will be understood by those skilled in the art, in the example embodiments of the present disclosure, a "module" or a "unit" performs at least one function or operation, and may be implemented, for example, using digital circuitry, with hardware, with software, or any combination thereof. In addition, a plurality of "modules" or a plurality of "units" may be integrated into at least one module except for a "module" or a "unit" which has to be implemented with specific hardware, and may be implemented with at least one processor (not shown).

Hereinafter, various example embodiments will be described in detail with reference to the accompanying drawings.

FIG. 1 is a block diagram illustrating a configuration of an apparatus 100-1 for providing image contents according to an example embodiment.

Apparatuses 100-1, 100-2, 100-3, 100-4, and 100-5 for providing image contents according to various example embodiments may be implemented by various display apparatuses. In detail, the apparatuses 100-1, 100-2, 100-3, 100-4, and 100-5 for providing image contents according to various embodiments may be implemented by any one of, for example, a digital television, a tablet personal computer (PC), a portable multimedia player (PMP), a personal digital assistant (PDA), a smart phone, a cellular phone, a digital frame, a digital signage, a Blu-ray player, a set top box, a media player, a DVD Player, a home theater system, a home entertainment system, a multimedia player, a kiosk, or the like, which are, for example, apparatuses including one or more display or being capable of outputting an image signal and apparatuses configured to execute an application or display contents.

Referring to FIG. 1, the apparatus 100-1 for providing image contents according to an example embodiment includes a scene configuring unit 110, a classifying unit 120, an input unit 130, and a display unit 140.

The scene configuring unit 110 is a component capable of dividing image contents into a plurality of scenes, each scene including a plurality of shots. Here, the shot includes at least one image frame, and may, for example, include a set of image frames viewed at one view point in a context of an image. The shot corresponds to a set of image frames generated, for example, by seamlessly photographing continuously a specific object by one camera. For example, in the case in which image frames 1, 2, and 3 displaying a front surface of a character A are present and image frames 4, 5, and 6 displaying a rear surface of the character A are present, when the image frames 1, 2, and 3 and the image frames 4, 5, and 6 are not images seamlessly connected to each other, the image frames 1, 2, and 3 and the image frames 4, 5, and 6 are different shots.

The scene is a set of shots associated with each other in a context of the image. Generally, the scene may be determined by whether or not a character appearing in the image and a space in which the character is positioned coincide with each other. For example, shots 1, 2, and 3 in which characters A, B, and C appear in a space D and shots 4, 5, and 6 in which characters A, B, E appear in a space F are scenes different from each other. Time information may be further considered in order to distinguish scenes from each other. That is, continuous shots within a preset time may define the same scene, while shots after the preset time may define another scene.

The scene configuring unit 110 divides the image contents into the plurality of scenes, each scene including the plurality of shots. The scene configuring unit 110 analyzes an image to detect a shot boundary, divides the shots, analyzes the shots, and merges selected shots with each other to configure a scene. This will be described below in more detail.

The classifying unit 120 is a component that classifies image frames for each scene depending on each of a plurality of characters appearing in the image contents. The classifying unit 120 may generate and manage image frame information in which the same character appears in each scene as a list. For example, the classifying unit 120 may generate and manage image frame information on a character A as a list and generate and manage image frame information on a character B as a list, in, for example, a scene 0. In addition, the classifying unit 120 may generate and manage image frame information on characters A and C as lists in, for example, a scene 1.

The input unit 130 is a component that receives a user input. For example, the input unit 130 may receive a user input for selecting any one of the plurality of characters. A display unit 140 to be described below may, for example, display a user interface for the user input. The display unit 140 may, for example, display at least one of character information and scene information included in the image contents as a classification result of the image frames by the classifying unit 120. A user may perform an input by, for example, selecting at least one of character information and scene information that the user wants to view.

The input unit 130 may, for example, include at least one physical button or a touch panel included in the apparatuses 100-1, 100-2, 100-3, 100-4, and 100-5 for providing image contents. The user generates a corresponding control command by, for example, pressing the button or touching an object on the touch panel, and the apparatuses 100-1, 100-2, 100-3, 100-4, and 100-5 for providing image contents are operated depending on the generated control command.

The input unit 130 may, for example, be a remote control apparatus including a near field communication module. The user may, for example, generate a control command by pressing a button of the remote control apparatus. In the case in which the remote control apparatus includes, for example, a touch panel or a movement sensor, a touch of the user or movement of a remote controller may generate the control command.

The display unit 140 is a component that displays various objects. Particularly, the display unit 140 may display a scene corresponding to the character selected depending on the user input. For example, when the character A is selected, the display unit 140 may display a scene including the character A or display a shot including the character A. In the former case, the scene including the character A may include both a shot that includes the character A and a shot that does not include the character A. On the other hand, when the character A is selected and a specific scene is selected, the display unit 140 may display only a shot including the character A in the selected scene.

The display unit 140 may be implemented by various display panels. That is, the display unit 140 may be implemented by various display technologies such as, for example, an organic light emitting diode (OLED), a liquid crystal display (LCD) panel, a plasma display panel (PDP), a vacuum fluorescent display (VFD), a field emission display (FED), an electro-luminescence display (ELD), and the like. The display panel may be implemented by a light emitting type display, but may also be implemented by a reflective display (E-ink, P-ink, photonic crystal). In addition, the display panel may, for example, be implemented by a flexible display, a transparent display, or the like. In addition, the apparatus 100-1 for providing image contents may be implemented by a multi-display apparatus including two or more display panels.

Next, various example embodiments will be described in more detail.

Figure 2:
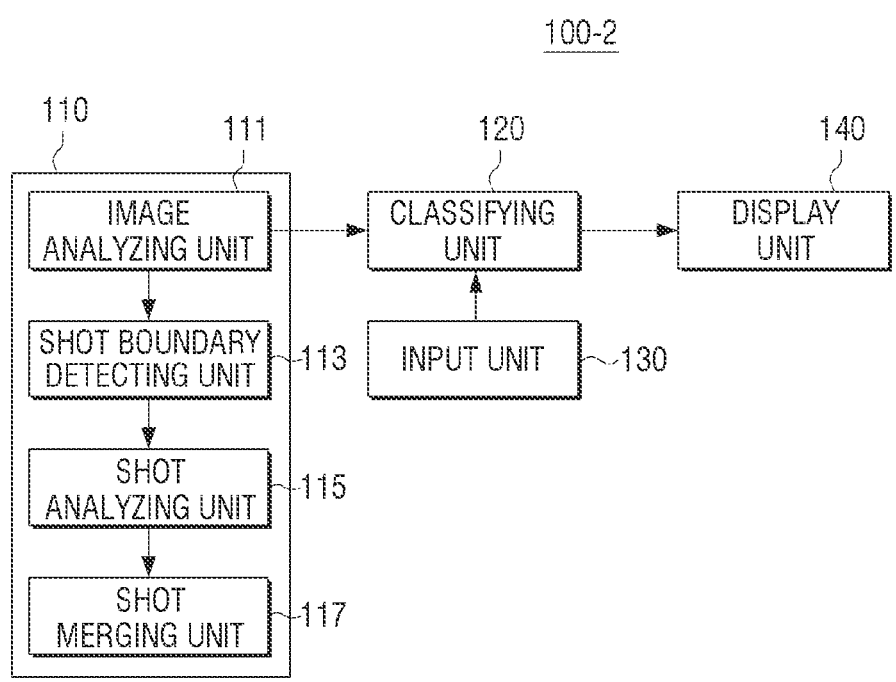
FIG. 2 is a block diagram illustrating a configuration of an apparatus for providing image contents according to another example embodiment.

FIG. 2 is a block diagram illustrating a configuration of an apparatus 100-2 for providing image contents according to another example embodiment; and FIGS. 3A to 3C are views illustrating vector information generated as an image analysis result.

Referring to FIG. 2, the apparatus 100-2 for providing image contents according to an example embodiment includes a scene configuring unit 110, a classifying unit 120, an input unit 130, and a display unit 140. An overlapped description for the classifying unit 120, the input unit 130, and the display unit 140 will be omitted. The scene configuring unit 110 may include an image analyzing unit 111, a shot boundary detecting unit 113, a shot analyzing unit 115, and a shot merging unit 117, as illustrated in FIG. 2.

The image analyzing unit 111 is a component for analyzing the image contents. The image analyzing unit 111 may configure a feature vector as a result of analyzing the image contents. The feature vector may, for example, include an image feature vector, an image difference feature vector, and an audio feature vector. The image feature vector may, for example, include at least one of a Pixel Color (e.g., average and variance of an image color (RGB/HSV)), a Color Histogram, an Edge (e.g., edge information), and Face IDs (face recognition ID information) of one image frame, as illustrated in FIG. 3A. The image feature vector may, for example, be generated and managed in a list form. In addition, the image difference feature vector may, for example, include at least one of a Pixel Color Difference (e.g., pixel difference), a Color Histogram Difference (e.g., histogram difference), Motion Vectors (e.g., size of a motion vector), and an Edge Difference (e.g., edge size of a difference image) between two continuous frames, as illustrated in FIG. 3B. In addition, the image analyzing unit 111 may analyze audio data included in the image contents. In this case, the audio feature vector may include at least one of volume, power, spectrum, as illustrated in FIG. 3C, and energy, sub-band energy, a low shot-time energy ratio, a zero crossing rate, a frequency centoid, a frequency bandwidth, a spectral flux, and a cepstral flux (not shown) analyzed from an audio having a predetermined length. The image difference feature vector and the audio feature vector may also be generated and managed in a list form.

The image difference feature vector is used as an input of shot boundary detection, as described below, and the image feature vector and the audio feature vector are used to determine a feature vector in a shot unit. All of the features used as elements analyzing the image and the audio enumerated herein are not necessarily used, and these features may be replaced by other features. For example, when used in a mobile device in which only a central processing unit (CPU) and a memory limited in real time are usable, motion information, edge information extraction, a face recognizer, and the like, requiring a large amount of processing or computational overhead may be excluded from a feature vector configuration or be replaced by other features. The image difference feature vector may be generated and managed in a list form.

The shot boundary detecting unit 113, which is a component detecting a shot boundary, detects the shot boundary based on the image difference feature vector. The shot boundary detecting unit 113 detects whether or not an image change of a predetermined size or more is generated between the previous image frame and the current image frame using the image difference feature vector extracted in the previous step. Here, the detected shot boundary may, for example, include fade in/out gradually changed by an image editing effect and a dissolve effect as well as a rapid change in the image.

The shot boundary detecting unit 113 may, for example, create a shot boundary detector using a difference vector of the image as an input and using whether or not the current frame corresponds to a shot boundary as an output through a machine studying algorithm in order to effectively detect the shot boundary. Here, various methods such as, for example, a support vector machine, a neural network, a decision tree, or the like, may be used as the machine studying algorithm.

The shot analyzing unit 115 is a component for analyzing the shots based on the shot boundary information. For example, the shot analyzing unit 115 may divide the shots based on the shot boundary and generate shot feature vectors for each shot.

Figure 4:
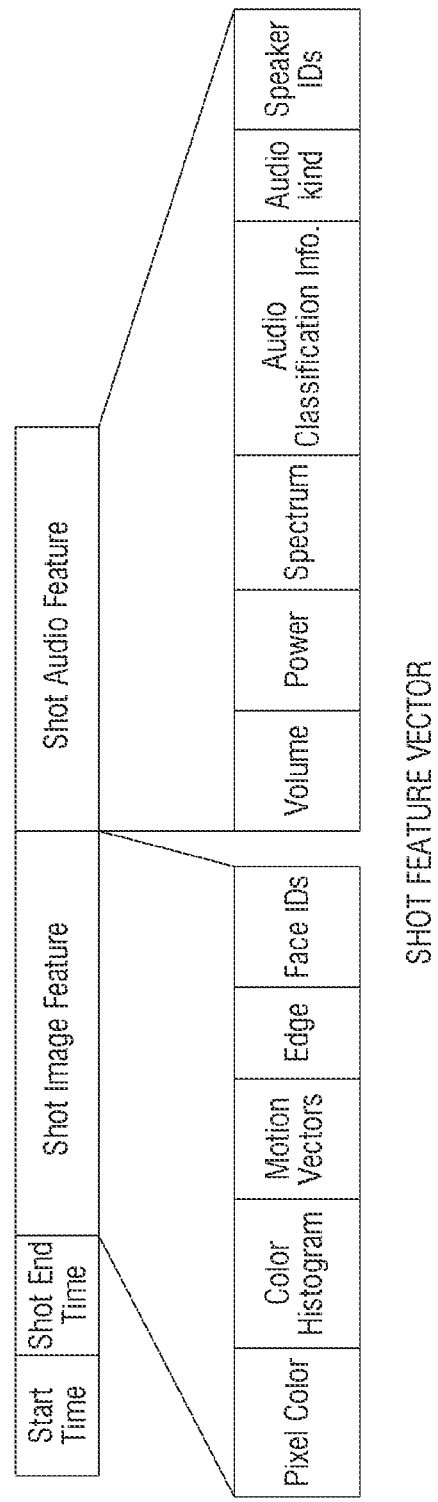
FIG. 4 is a view illustrating a structure of a shot feature vector according to an example embodiment.

FIG. 4 is a view illustrating an example structure of a shot feature vector according to an example embodiment.

The shot analyzing unit 115 generates a shot feature vector including, for example, at least one of shot start time information (Start Time) indicating start time information of each of a plurality of shots, shot end time information indicating end time information of each of the plurality of shots, image feature values (Shot Image Feature) of a plurality of image frames included in one shot, and audio feature values (Shot Audio Feature) of the plurality of image frames included in one shot.

Start times of the shots are used to calculate a time difference between the shots in the next shot merging step discussed below. The shot image feature includes, for example, at least one of a Pixel Color, a Color Histogram, Motion Vectors, an Edge (e.g., average and variance of image feature vectors configuring the shot) and face IDs detected by a face recognizer, as illustrated in FIG. 4. The shot audio feature includes, for example, at least one of an audio kind analysis, audio classification information obtained through speaker recognition, and a speaker recognition ID, in addition to an average and a variance of audio feature vectors (including, for example, Volume, Power, Spectrum, etc.) configuring the shot. Here, an audio kind is information divided into an audio dialogue, music, silence, and the like, and the speaker recognition is information in which the same ID is allocated to a speaker having the same voice.

The audio kind analysis and the speaker recognition used in the shot audio feature may, for example, be extracted through an audio kind recognizer and a speaker recognizer performing corresponding functions using audio data of a shot section as inputs. All of features used as elements analyzing the image and the audio in a shot unit enumerated herein are not necessarily used, and these features may be replaced by other features. For example, when used in a mobile device in which only a central processing unit (CPU) and a memory limited in real time are usable, the speaker recognition, the audio kind analysis, and the like, requiring a large amount of processing or computational overhead may be excluded from a feature vector configuration or be replaced by other features.

The shot merging unit 117 groups the plurality of shots into one scene based on a similarity between the generated shot feature vectors.

The shot merging unit 117 inputs a series of feature vectors that are previously detected to a window having a predetermined size in a form such as, for example, a queue and compares the shot feature vectors within the window to each other.

In the case in which a similarity between a first shot feature vector and an n-th shot feature vector is greater than or equal to a preset value, the shot merging unit 117 groups all shots from a first shot to an n-th shot into the same scene (here, n is an integer number larger than 1). That is, when shots similar to each other are present, the shot merging unit 117 performs a process of merging all of shots between, for example, at least two similar shots with each other to generate one scene.

The shot merging unit 117 inputs a newly detected shot (e.g., current shot) to a merge window. In addition, the shot merging unit 117 may, for example, compare a similarity between the newly added current shot to the merge window and the existing shots. When the similarity between two shots is greater than or equal to a reference value, the same scene number is allocated to all shots between a comparison shot and the current shot. However, when the similarity between the two shots is less than the reference value, a new scene number is allocated to the current shot. Whenever a new shot is detected, the above-mentioned process is repeated.

A size of the merge window is at least 2 or more, and may be arbitrarily changed. At the time of comparing the similarity between the shots within the merge window, a shot difference feature vector is generated from a shot feature vector obtained from the previous step, and is used as an input to a shot similarity detector studied by the machine studying algorithm. The shot similarity detector returns a similarity between the shots as a numerical value having a value in a predetermined range, and determines that the two shots are the same scene when the similarity is greater than or equal to a set threshold value.

FIGS. 5 to 8 are views illustrating a scene grouping method according to an example embodiment.

Figure 5:
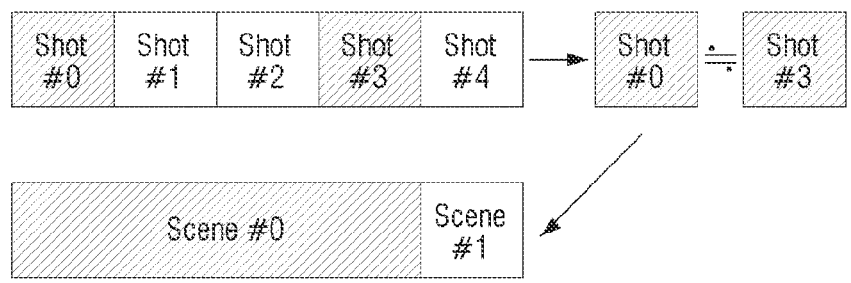

In FIG. 5, a new shot 4 is compared with shots 0 to 3 currently included in a merge window. Since a similarity is less than a reference value, a new scene number different from a scene number allocated to the previous shots is allocated to the shot 4. The shot 3 in the previous step based on the new shot 4 is compared with shots included in the merge window. Since the shot 3 is similar to the shot 0 as a comparison result, the same scene number 0 is allocated to the shots 0 to 3.

Figure 6:
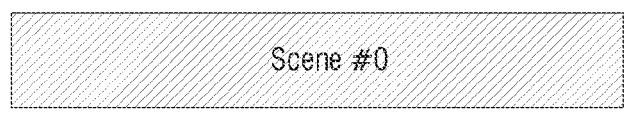

In FIG. 6, a new shot 5 is added to the merge window. Likewise, the shot 5 is compared with the previous shots included in the merge window. Since the shot 2 and the shot 5 are similar to each other as a comparison result, the same scene number is allocated to the shots 2 and 5. However, since the shot 2 is grouped into a scene 0 in the previous step, the shot 5 is also grouped into the same scene 0.

In FIG. 7, a new shot 6 is added to the merge window. Likewise, the shot 6 is compared with the previous shots included in the merge window. Since a shot similar to the shot 6 is not present as a comparison result, a new scene number 1 is allocated to the shot 6.

In FIG. 8, a new shot 7 is added to the merge window. Likewise, the shot 7 is compared with the previous shots included in the merge window. Since a shot similar to the shot 7 is not present as a comparison result, a new scene number 2 is allocated to the shot 7.

Figure 9:
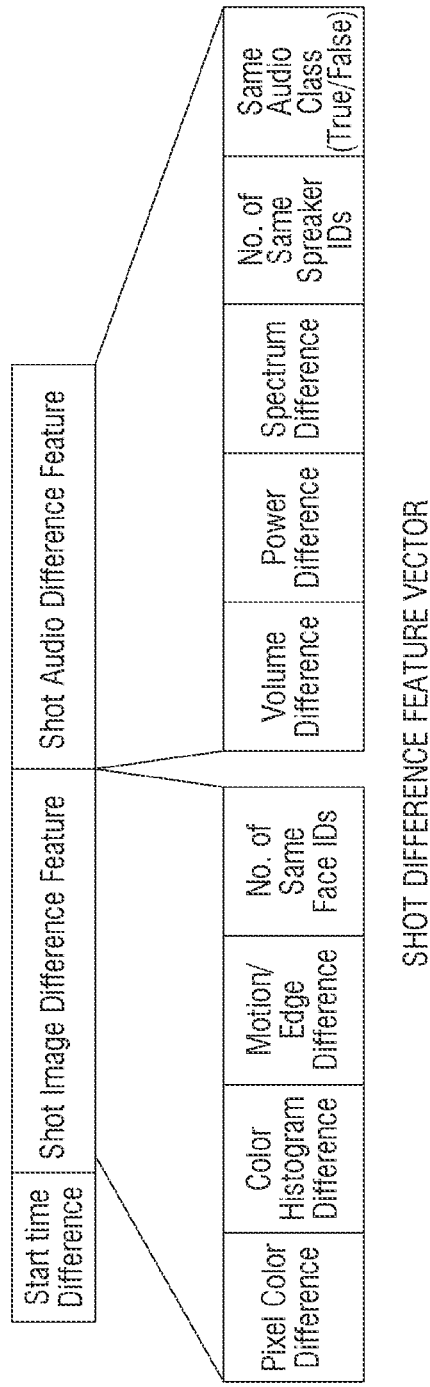
FIG. 9 is a view illustrating a shot difference feature vector according to an example embodiment.

FIG. 9 is a view illustrating a shot difference feature vector according to an example embodiment.

As illustrated in FIG. 9, the shot difference feature vector includes Start time Difference, Shot Image Difference Feature, and Shot Audio Difference Feature fields. In the start time difference field, the smaller (e.g., less than a preset value) the difference time between the shots, the higher the possibility that two shots will be the same scene. Therefore, the start time difference between the shots may be used as an important variable in deciding the similarity between the shots. In the Shot Image Difference Feature field, at least one of a color value distribution difference between the shots (Pixel Color Difference), a histogram distribution difference (Color Histogram Difference), a motion/edge difference, and the number of same face IDs present in common in the two shots is used as an image feature. In the Shot Audio Difference Feature field, at least one of the number of same speaker IDs and the same kind of audio (Same Audio Class (True/False)) in addition to volume difference, power difference, and spectrum difference between the shots is used as an audio feature.

In image based scene change technologies according to the related art, only a simple change between continuous images is determined to detect a point at which the image is rapidly changed. Therefore, in the case of a scene in which an image is rapidly changed in a moving picture, there is a problem that many more than the required shots are detected. In addition, when a scene change detecting technology is applied to a rapid search function and summary function for a moving picture having a story, a function capable of detecting scenes associated with each other in context as one scene is required. However, the image based scene change technologies according to the related art do not have this function.

The apparatus 100-1 for providing image contents according to various example embodiments described above provides a queue window based scene change detecting method comparing several continuous shots with each other and merging the several continuous shots as one scene, by utilizing both image analysis information including time information of the shots, face recognition information and audio information including speaker recognition, instead of simply comparing and merging audio information between adjacent shots with each other.

Particularly, the example embodiments are characterized in that a similarity between shots that are not adjacent to each other is compared using a window having a predetermined size to decide whether or not scenes are similar to each other. In addition, at the time of comparing the similarity between the shots, the start time information and the image feature information of the shots as well as the audio feature information, for example, are simultaneously utilized to compare shots in which it is difficult to find a similarity only by the audio feature, thereby making it possible to better determine whether scenes are the same and/or similar to each other. In addition, the face recognition in the image analysis and the speaker recognition information in the audio analysis may be utilized to compare similarity between shots, thereby making it possible to detect a scene in which association is considered in context.

Figure 10:
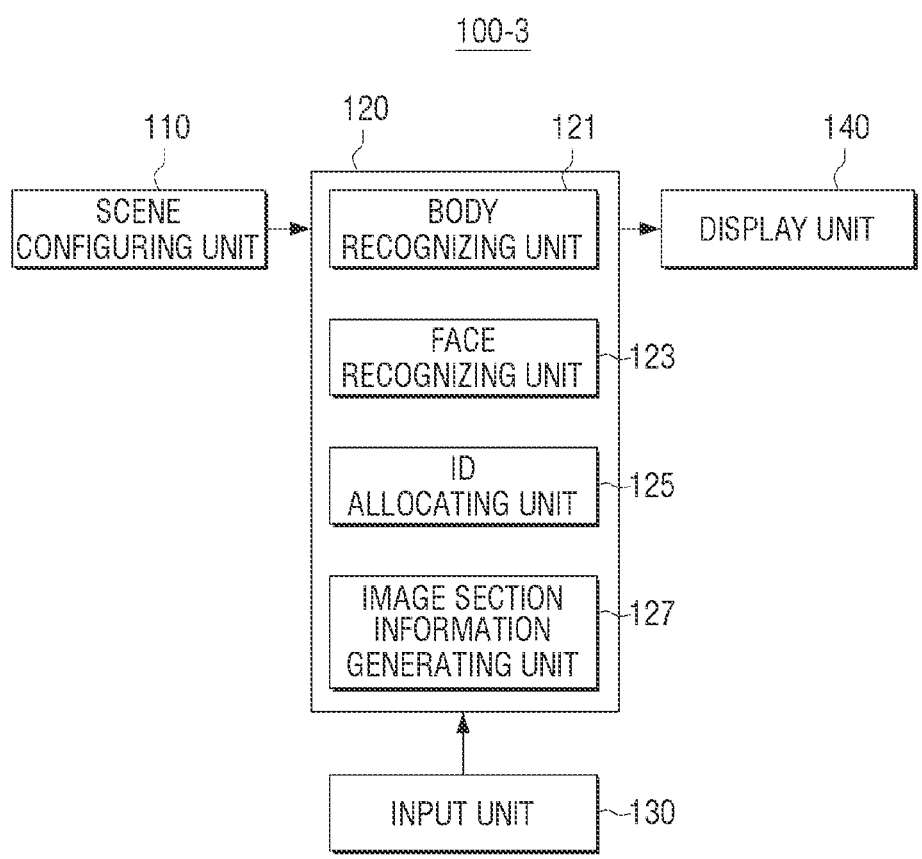
FIG. 10 is a block diagram illustrating a configuration of an apparatus for providing image contents according to another example embodiment.
Figure 11:
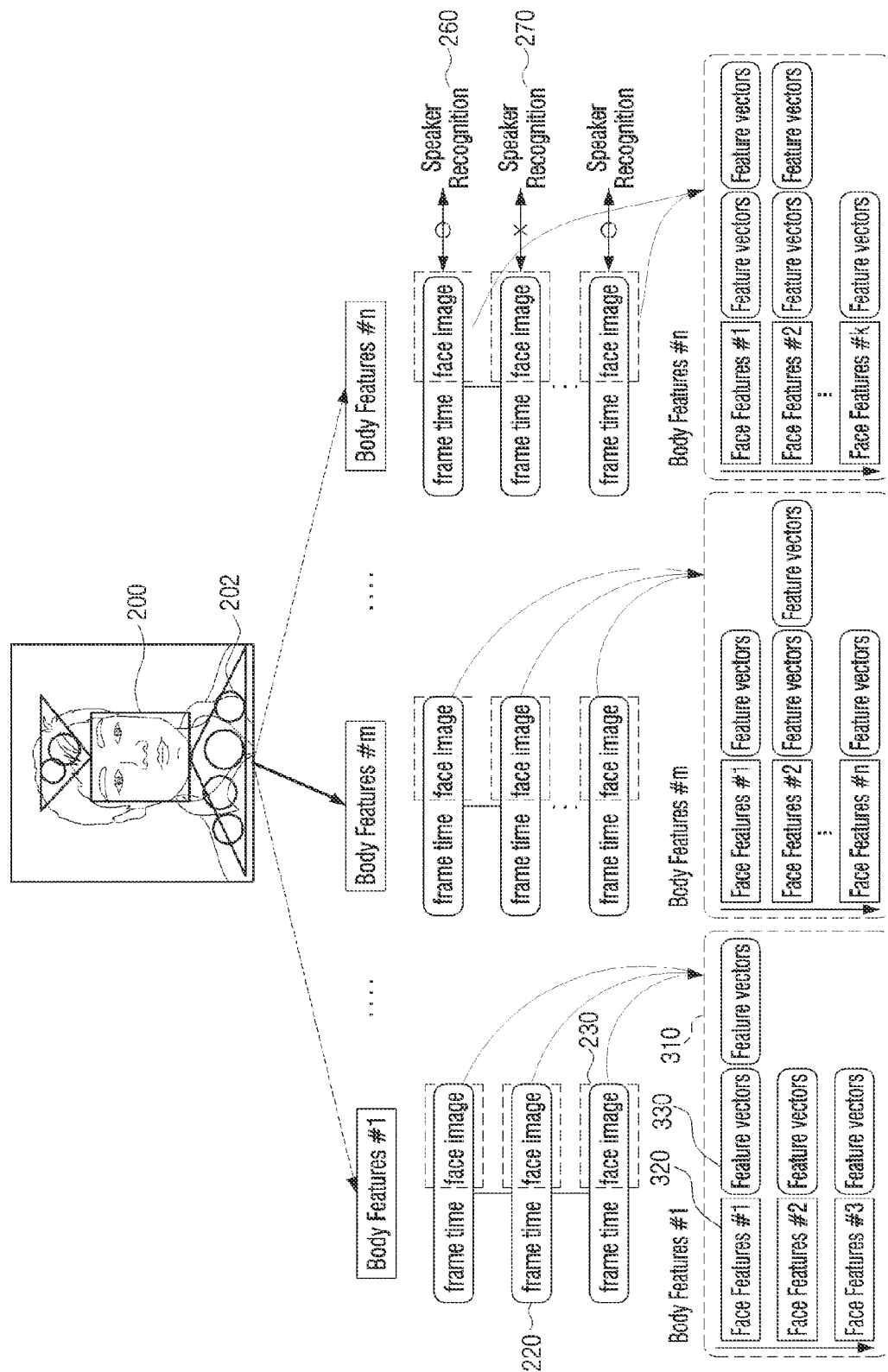
FIGS. 11 to 13 are views illustrating data structures for classifying image frames according to various example embodiments.
Figure 12:
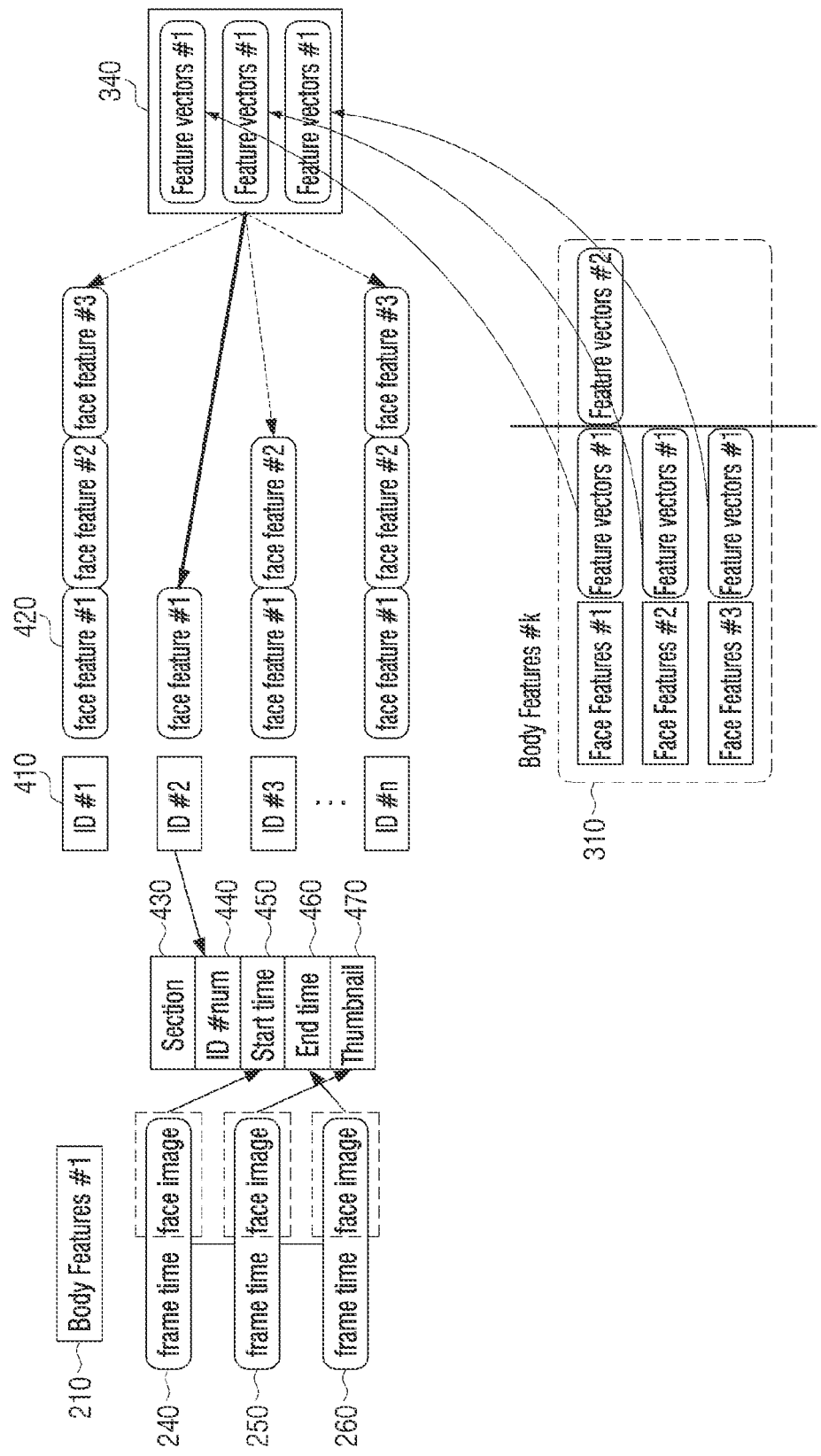
Figure 13:
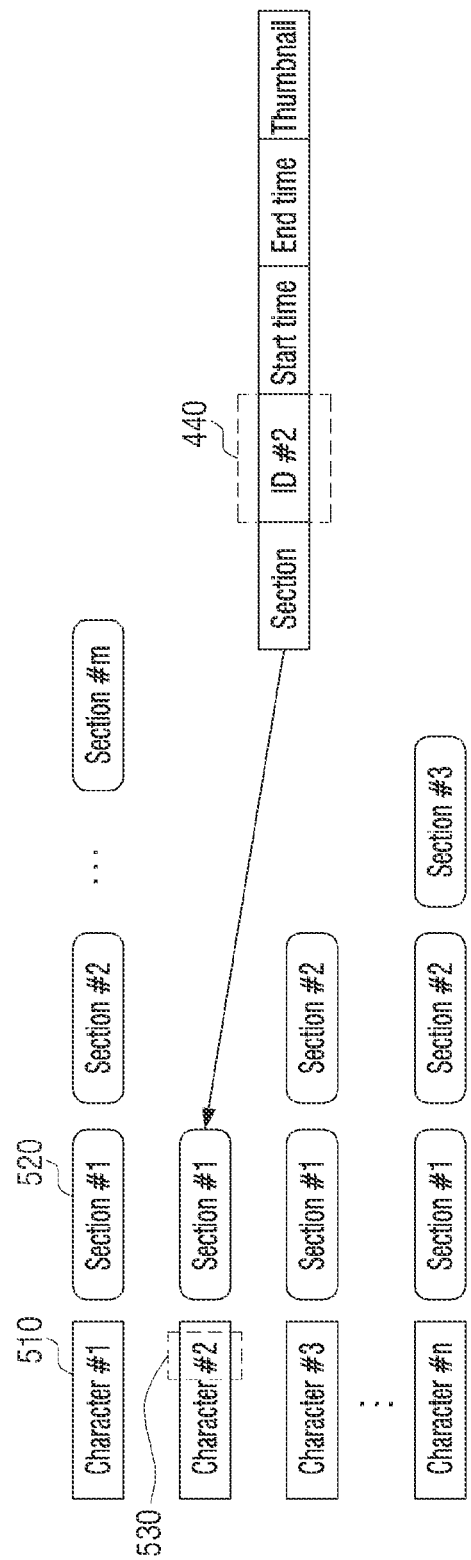

FIG. 10 is a block diagram illustrating a configuration of an apparatus 100-3 for providing image contents according to another example embodiment; and FIGS. 11 to 13 are views illustrating data structures for classifying image frames according to various example embodiments.

Referring to FIG. 10, a classifying unit 120 of the apparatus 100-3 for providing image contents according to another example embodiment includes a body recognizing unit 121, a face recognizing unit 123, an ID allocating unit 125, and an image section information generating unit 127. Since the input unit 130 and the display unit 140 have been described above, an overlapped description will be omitted.

The body recognizing unit 121 classifies image frames included in a first scene depending on body information of the image frames when a scene change from the first scene to a second scene is generated. For example, the body recognizing unit 121 analyzes all of image frames included in the first scene to group image frames that may be considered to be the same body information depending on a feature value corresponding to the body information of the image frames. In other words, different groups may indicate different characters.

As a result, the body recognizing unit 121 generates a node list having body feature information for each group. With reference to FIG. 11, a lower node of each group includes frame time information 220 in which a partial region of the body is extracted and a detected face image 230. When a group matched to extracted body feature information is not present, the body recognizing unit 121 generates a new group and allows the new group to be included in a lower node of the group. However, when an error occurs in a comparison process of information on a portion of the body, information on unintended characters may be included as a component. In order to remove this error element, main speaker recognition information 260 identified in audio information on an image frame and the face image 230 in the component may be compared to each other to determine whether or not the main speaker recognition information 260 and the face image 230 coincide with each other, and element 270 that does not coincide with each other is removed from the group when the elements 270 are detected.

The face recognizing unit 123 analyzes face information of the classified images frame to extract face feature information. Whenever new data are added to the group, the face recognizing unit 123 extracts face feature information from a face image included in corresponding data and generates a face feature list 310 for each group. The face feature list 310 includes a plurality of face feature nodes 320 depending on the face feature information, as illustrated in FIG. 11. The face feature node 320 includes distinguished face feature information of a character belonging to the group. In addition, a face feature node 320 includes a feature vector 330 of the image frame having face features similar to each other.

When the face feature list 310 is generated as described above, the ID allocating unit 125 searches a matched face feature in a preset ID list 410, as illustrated in FIG. 12. The ID allocating unit 125 allocates an ID to the classified image frame based on the extracted face feature information 320. In detail, as illustrated in FIG. 12, the ID list 410 includes at least one face feature node 420 indicating face feature information of a character for each ID. The ID allocating unit 125 compares the extracted face feature information 320 with the face feature information 420 for each ID of the ID list 410 to search for a matched ID. In addition, the ID allocating unit 125 allocates the matched ID to the classified image frame. For example, the ID allocating unit 125 allocates the matched ID to the classified group.

The feature vectors are bound in one unit 340 under the assumption that values thereof may vary depending on a face look or pose even in the case of the same character, and are registered as a new ID or added as a lower element of an existing generated ID through a feature vector comparing process.

The image section information generating unit 127 generates image section information to which the ID for the first scene is allocated. In detail, as illustrated in FIG. 12, the image section information generating unit 127 generates the image section information including a section name 430, an ID 440, a section start time 450, an end time 460, and a representative thumbnail image 470 for a character of the section.

As illustrated in FIG. 13, scene information is managed for each character. A character node 510 is connected to a scene node 520 in which a character appears, and the scene node 520 is connected to the image section information. Therefore, scene information in which a corresponding character appears may be recognized through the character node 510, and access to image section information for each scene may be made. The character ID 440 of the image section information is classified through a comparison process with a character ID 530 of each character node 510, and in the case in which a matched group is not present, a new ID is allocated to generate a group (character node) and is added to the scene node 520. Finally, scene information (e.g., start/end/thumbnail) on unspecified characters is collected, and scene information on a character ID selected by a user is transferred to an upper system, such that the user may, for example, view only contents scenes for selected characters.

Figure 14:
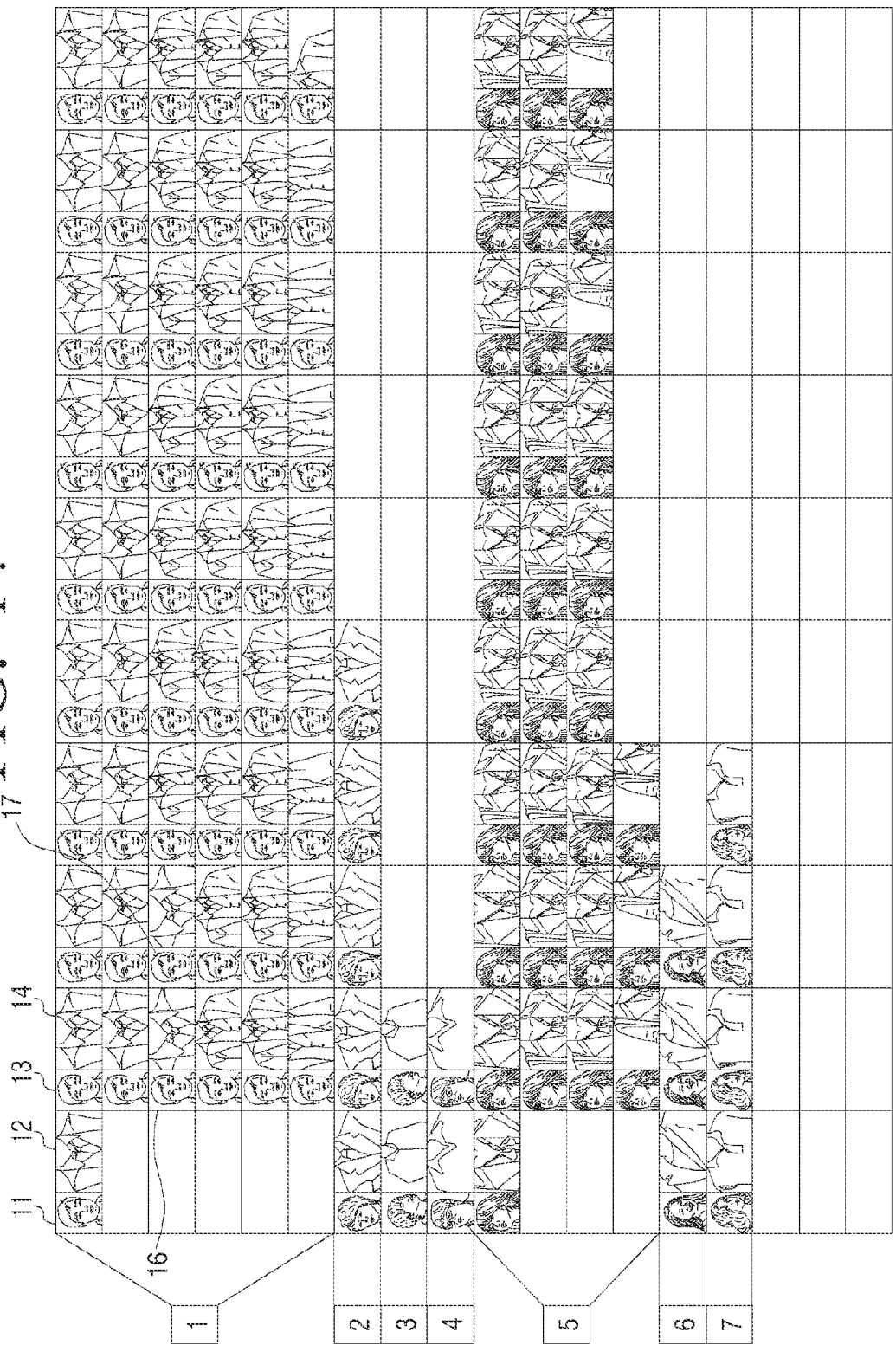
Figure 15:
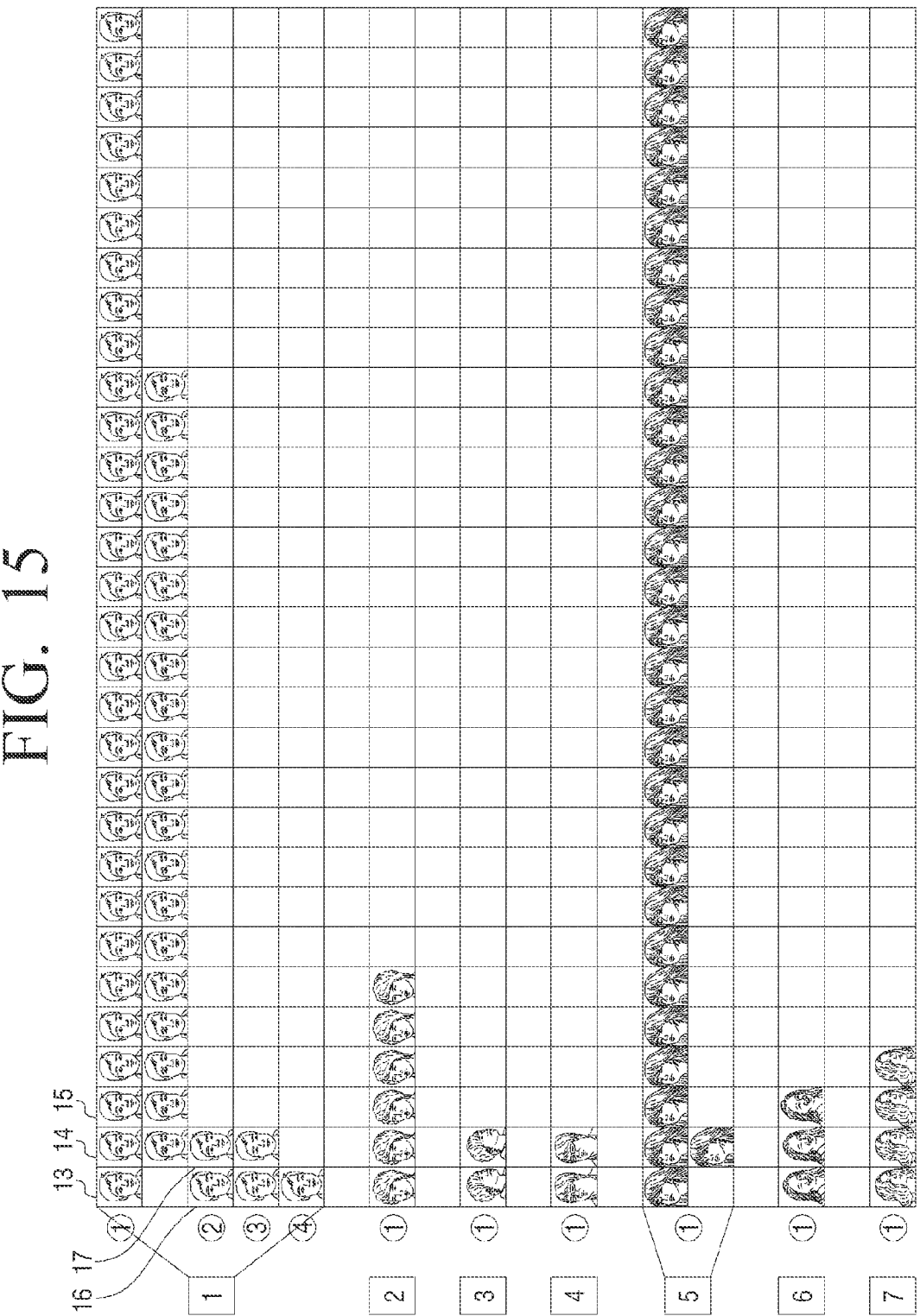
Figure 16:
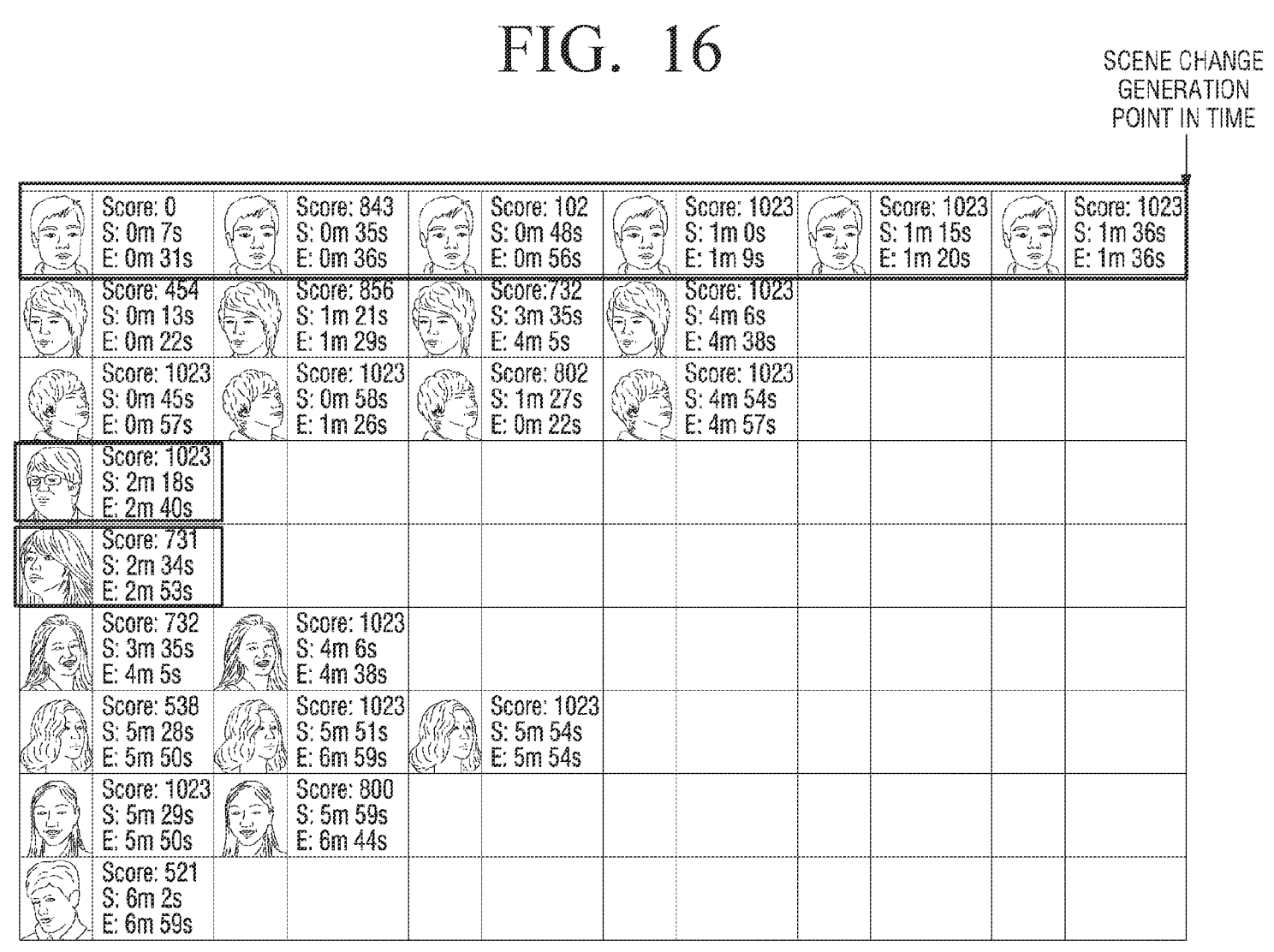

FIGS. 14 to 16 are views illustrating an image frame classifying process according to an example embodiment.

As illustrated in FIG. 14, when a scene change from a first scene to a second scene is generated, all image frames included in the first scene are analyzed to group image frames that may be considered to be the same body information depending on feature values corresponding to body information of the image frames. In FIG. 14, a face image 11 and a body image 12 of a first image frame and a face image 13 and a body image 14 of a second image frame are illustrated. It may be appreciated that image frames may, for example, be classified for seven characters numbed from 1 to 7. Here, main speaker recognition information identified in audio information on each image frame and a face image in a component are compared with each other to decide whether or not the main speaker recognition information and the face image coincide with each other, and when elements that do not coincide with each other are detected, the elements may be removed from the group.

In addition, the above-mentioned face recognizing unit 123 analyzes face information of the classified image frame to extract face feature information. The face feature list includes, for example, a plurality of face feature nodes 320 depending on the face feature information. The face feature node 320 indicates a face feature distinguished depending, for example, on a face look or direction in the same character. FIG. 15 illustrates a result of classifying the same character for each face feature node. It may be appreciated in FIG. 14 that image frames 16 and 17 having a feature distinguished from other image frames among image frames are classified into a separate face feature node 320. In FIG. 15, body information corresponding to the face feature is omitted.

The ID allocating unit 125 allocates an ID to the classified image frame based on the extracted face feature information, and the image section information generating unit 127 generates image section information to which the ID for the same scene is allocated. FIG. 16 illustrates finally generated image section information.

In the related art, since only face feature information in the image contents is used to identify an appearing character or perform scene summary for a specific character, it is required to collect and build up a database for characters in advance. However, since a recognition result may be significantly changed depending on a face look or a face pose of a character even in the case of the same character, there is a limitation in identifying the same character with only the face feature information, and a process of collecting and building up information on specific characters in advance requires a separate time and resources, which is inconvenient.

A feature of the example embodiments is to collect scenes for a plurality of unspecified characters appearing in the image contents. That is, real time image and audio data are analyzed in an on-line scheme in which it is not necessary to collect and build up character database information in advance, and unique ID values are assigned to detected anonymous characters, thereby allowing the unspecified characters to be identified. In addition, more robust character identification is performed by considering other feature information in addition to face information of the characters instead of using a single characteristic such as a face recognizer in order to identify the characters. To this end, the face information and the information on a portion of the body are merged with each other, and the same character scene collection provide robust character identification, even where various face looks or face poses are performed using, for example, the main speaker information recognized through an audio analysis.

Figure 17:
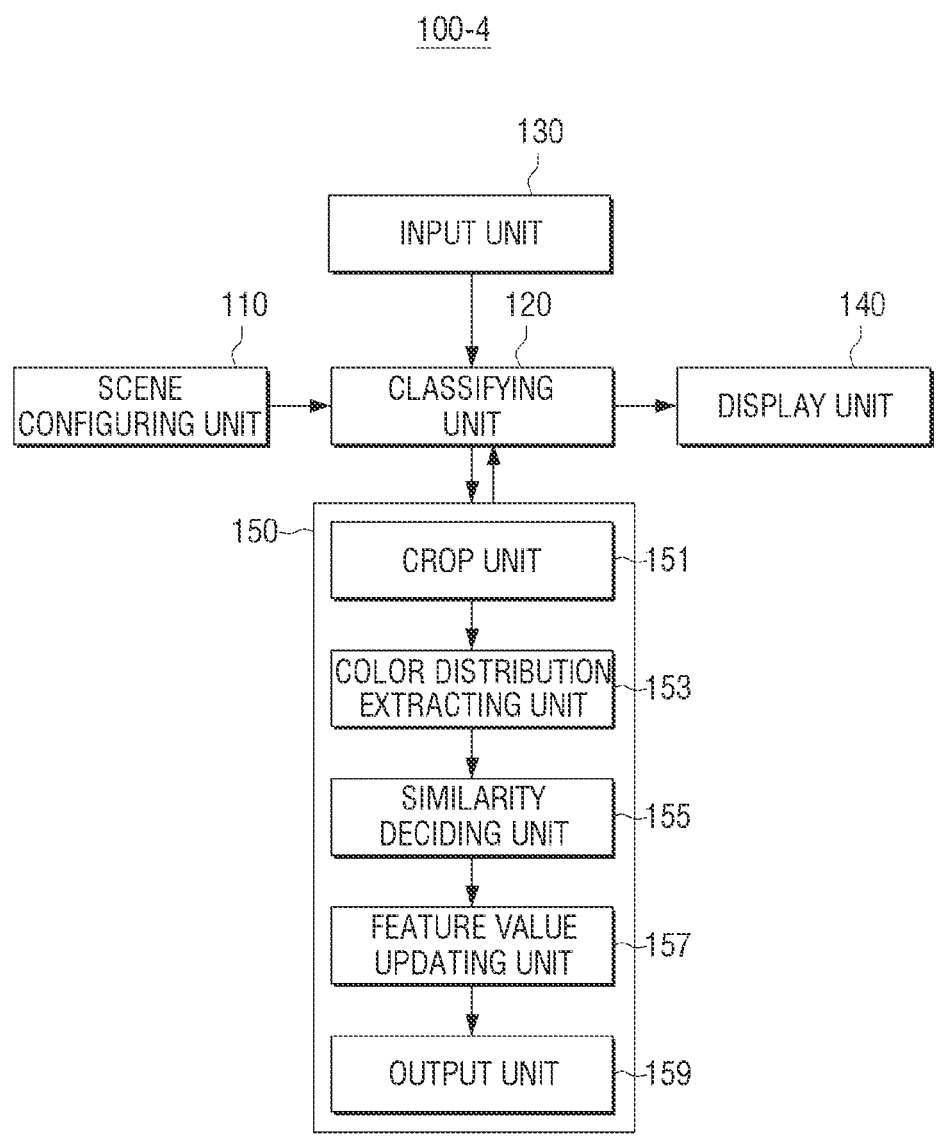
FIG. 17 is a block diagram illustrating a configuration of an apparatus for providing image contents according to still another example embodiment.

FIG. 17 is a block diagram illustrating a configuration of an apparatus 100-4 for providing image contents according to still another example embodiment.

Referring to FIG. 17, the apparatus 100-4 for providing image contents may further include a same character deciding unit 150. The same character deciding unit 150 may include a crop unit 151, a color distribution extracting unit 153, a similarity deciding unit 155, a feature value updating unit 157, and an output unit 159. The apparatus 100-4 for providing image contents includes a scene configuring unit 110, an input unit 130, and a display unit 140. Since the scene configuring unit 110, the input unit 130, and the display unit 140 have been described above, an overlapped description will be omitted.

The same character deciding unit 150 is a component that determines the sameness or similarity of characters included in the image frames. In the case in which an image representing a face of the character included in the image frame includes a background image, the same character deciding unit 150 identifies the character using image data in which a region corresponding to the background image in an image representing a body of the character is removed and transfers identification information to the classifying unit 120. The classifying unit 120 classifies the image frame based on the identification information.

For example, in the case in which the image representing the face of the character included in the image frame includes the background image, the same character deciding unit 150 generates an image in which the region corresponding to the background image in the image representing the body of the character is removed. In addition, the same character deciding unit 150 compares a similarity between the character included in the generated image and a character of the already classified group. The same character deciding unit 150 estimates a range of information of the character based on a position at which the character is detected and a face size after the character is detected, and compares the character with the character of the already classified group using, for example, distribution of color information in the corresponding range to decide whether or not the characters are the same as each other. In the case in which the similarity is greater than or equal to a preset value as a comparison result, the same character deciding unit 150 transfers the identification information to the classifying unit 120, and allows the generated image to be included in the already classified group.

Figure 18:
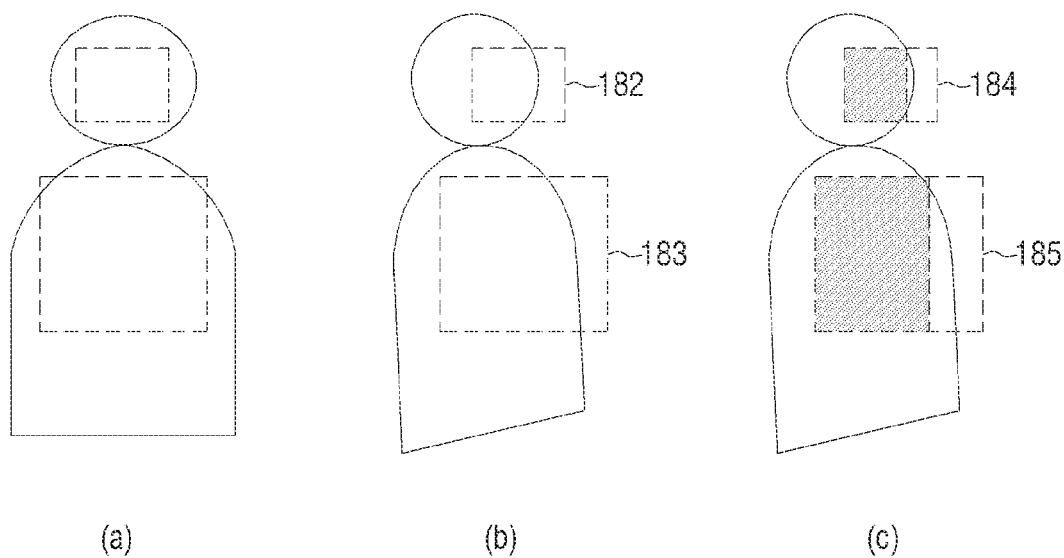
FIG. 18 is a view illustrating a change in a character position estimating range depending to a posture of a character.

FIG. 18 is a view illustrating a change in a character position estimating range depending to a posture of a character.

The crop unit 151 estimates a body position of the character based on a face size and position detected from the face recognizer. In addition, the crop unit 151 estimates information on turning of the face based on flesh color distribution in a face range to correct the body position of the character.

In the case in which the face position and size of the character are obtained through the face recognizer, when the character views the front, a problem is not generated ((a) of FIG. 18). However, when a posture of the character is turned, a background may be included in the range of the character, as illustrated in (b) of FIG. 18B. When the background is included in the range of the character, in the case in which the same character appears in different backgrounds, an variance in character information may be generated. Therefore, it is advantageous to estimate and correct how much a posture of the character in the contents is turned.

However, since a method of calculating relative positions, or the like, of a texture, such as eyes, a nose, a mouth, and the like, of the character in order to estimate the posture is a very computationally, resource and/or processor intensive recognition method, especially when being performed in the apparatus for providing image contents, it is not appropriate. Therefore, a turn degree of the character is estimated by a method of using a ratio of a flesh color occupying the face range, which is a relatively less cumbersome method, and it may also be reflected in a range of the user.

In the case in which the posture of the character is turned to the left as illustrated in (b) of FIG. 18, position estimation of the face moves to the left based on the character (right based on a viewer) due, for example, to positions of eyes, a nose, and a mouth. In this case, whether a background rather than the face is present at the right position based on the viewer, is determined, for example, based on the flesh color, and the posture of the character may be approximately estimated. As illustrated in (c) of FIG. 18, a body position range 185 of the character may be estimated in the same ratio as that of the face 184. That is, an image in which a portion of the body range is removed from the body range estimated may be based on an original face position in the same ratio as that of the face may be obtained.

The color distribution extracting unit 153 extracts color distribution of an image region in which the background is excluded from the face image and an image region in which the background is removed from the body image.

The similarity deciding unit 155 compares a similarity between the character and the character of the already classified group based on, for example, the extracted color information distribution. In the case in which the similarity is greater than or equal to a preset value or more, it is determined that the character is the same as that of the existing classified group.

The similarity may be determined using histogram distribution (color information distribution) of the color in order to determine the same character through, for example, a relatively simple calculation process. To this end, a color value may be normalized in order to decrease an influence by an illumination change for an image region decided to be the range of the character, a histogram is generated, and a smoothing process using a filter may be performed to decrease the influence of a finite change of a specific value.

Identification information of the character of the group determined to be similar may be transferred to the feature value updating unit 157. In addition, the similarity deciding unit 155 updates color distribution information of the character of the group determined to be similar.

The output unit 159 transfers the identification information depending on a comparison result to the classifying unit 120.

As described above, the example embodiments have an advantage that, unlike the related art, a number of images at various angles is managed as studying data by determining the similarity of the character through, for example, a simple algorithm.

Figure 19:
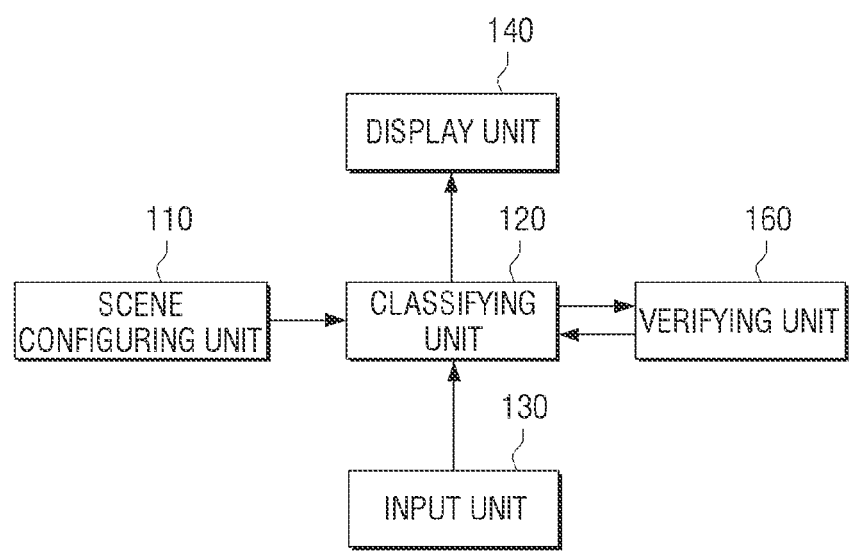
FIG. 19 is a block diagram illustrating a configuration of an apparatus for providing image contents according to still another example embodiment.

FIG. 19 is a block diagram illustrating a configuration of an apparatus 100-5 for providing image contents according to still another example embodiment.

Referring to FIG. 19, the apparatus 100-5 for providing image contents according to still another example embodiment includes a scene configuring unit 110, a classifying unit 120, an input unit 130, a display unit 140, and further includes a verifying unit 160. An overlapped description for the scene configuring unit 110, the classifying unit 120, the input unit 130, and the display unit 140 will be omitted.

The verifying unit 160 is a component that may verify the image frames classified by the classifying unit 120. For example, the verifying unit 160 verifies whether or not the scene nodes 520 included in the character node 510 described above are matched to features of the character node 510. To this end, the verifying unit 160 reads the scene nodes 520 included in the character node 510 one by one to compare a feature value of a character of the character node 510 and a feature value of a character of the scene node with each other. In the case in which the feature value of the character of the scene node 520 is similar to that of the character of the character nodes 510, a process proceeds to the next scene node 520 or the verification ends. In the case in which the feature value of the character of the scene node 520 is not similar to that of the character of the character nodes 510, the scene node 520 is deleted from the character node 510, and a character node 510 matched to the feature of the character of the scene node 520 is searched. When the character node 510 having a feature of a character similar to the feature of the character of the scene node 520 is found, the scene node 520 is inserted into the corresponding character node 510.

The similarity may, for example, be determined by the number of feature values having the same value in the case in which the character node 510 and the scene node 520 have a plurality of feature values. For example, in the case in which a number of feature values is five, when three or more feature values are the same, it may be determined that the characters are the same. A similarity in a predetermined range may be set for each feature value. For example, in the case in which a feature value is an age, the character node 510 may have a range of 31 to 35 year olds, and in the case in which an age of the scene node 520 belongs to the above-mentioned range, it may be determined that the characters are the same.

Figure 20:
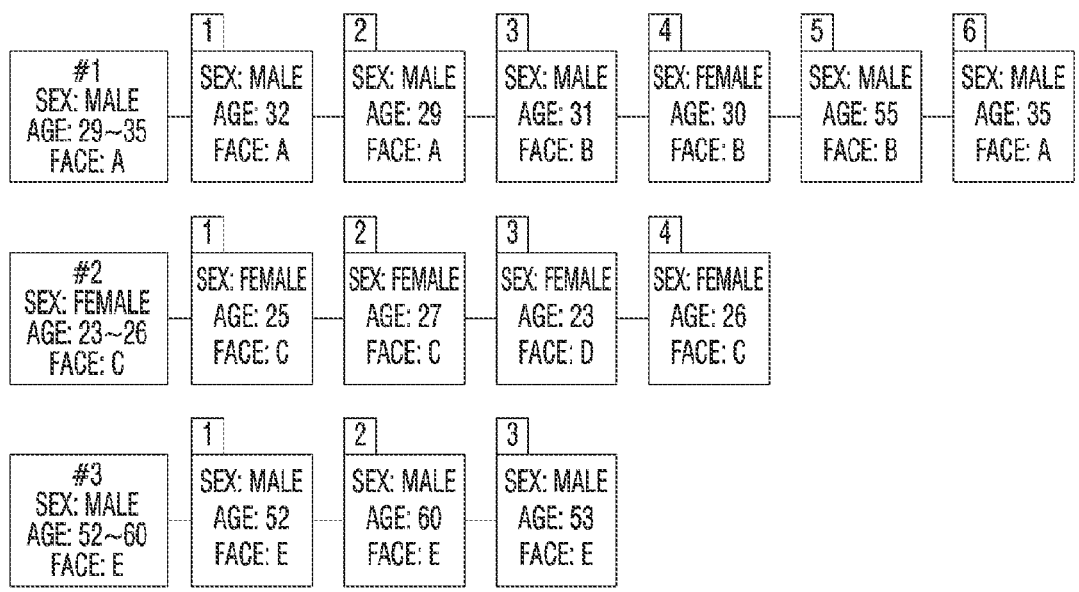
FIGS. 20 and 21 are views illustrating verification methods according to various example embodiments.
Figure 21:
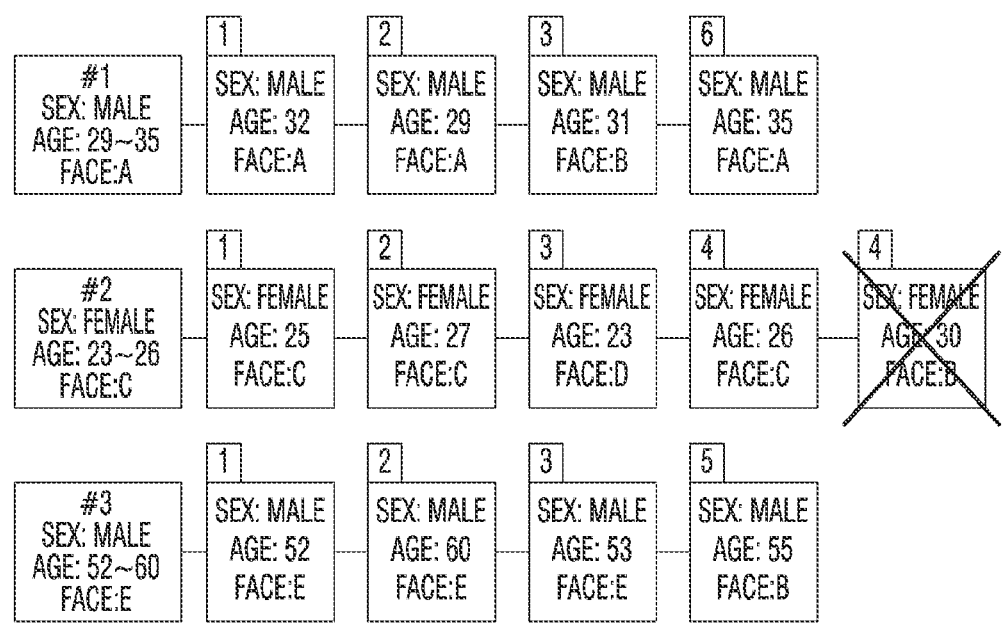

FIGS. 20 and 21 are views illustrating verification methods according to various example embodiments.

In an example embodiment of FIG. 20, it may be appreciated that a character #1 includes six scene nodes, a character #2 includes four scene nodes, and a character #3 includes three scene nodes. The verifying unit 160 compares feature values of the respective scene nodes with feature values of the character node from the character #1. Since a recognized face feature value in a scene node #3 of the character node #1 appears as B, there is a difference between a face feature value A of a character node #1 and the face feature value of the scene node #3. However, since an age and a sex, which are other features, are in a range similar to that of the character node #1, it may be determined that the scene node #3 is a scene node generally similar to the character node #1. On the other hand, in the case of scene node #4, since both of a sex and a face in a scene node #4 are different from that of the character node #1, the scene node #4 is deleted from the character node #1. In addition, it is determined whether feature values of the scene node #4 are similar to those of other character nodes #2 and/or #3. As illustrated in FIG. 20, since the scene node #4 of the character node #1 does not have a character node similar thereto, it is finally deleted. However, since feature values of a scene node #5 of the character node #1 are not similar to those of the character node #1, but are similar to those of the character node #3, it is included in the character node #3.

As described above, a verification method may be applied to a scene list of which classification is completed by character summary to re-classify an intermediate or final list, thereby making it possible to reduce erroneous recognition.

Next, methods for providing image contents according to various example embodiments will be described.

FIGS. 22 to 26 are flow charts of methods for providing image contents according to various example embodiments.

Figure 22:
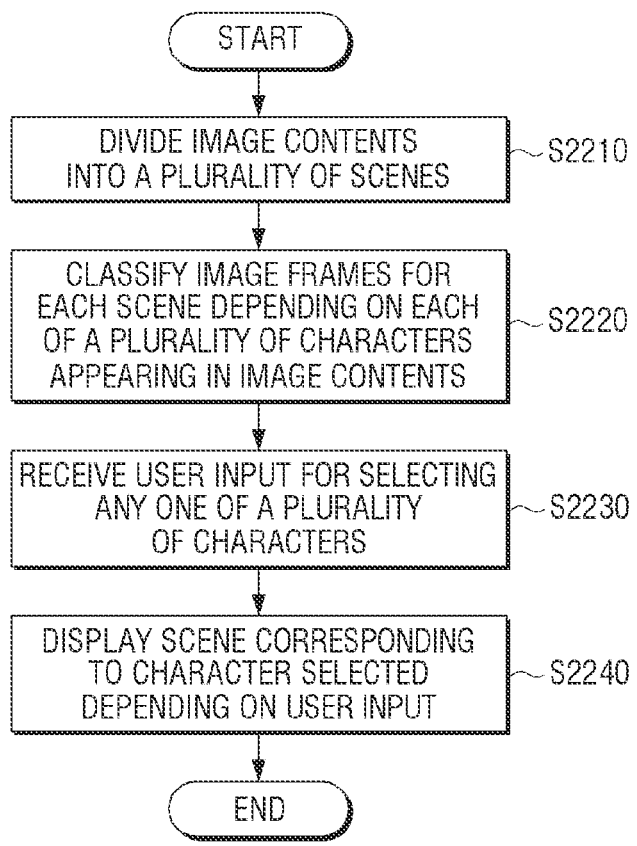
FIGS. 22 to 26 are flow charts of methods for providing image contents according to various example embodiments.

Referring to FIG. 22, a method for providing image contents according to an example embodiment may include dividing the image contents into a plurality of scenes, each scene including a plurality of shots (S2210), classifying image frames for each scene depending on each of a plurality of characters appearing in the image contents (S2220), receiving a user input for selecting any one of the plurality of characters (S2230), and displaying a scene corresponding to the character selected based on the user input (S2240).

Figure 23:
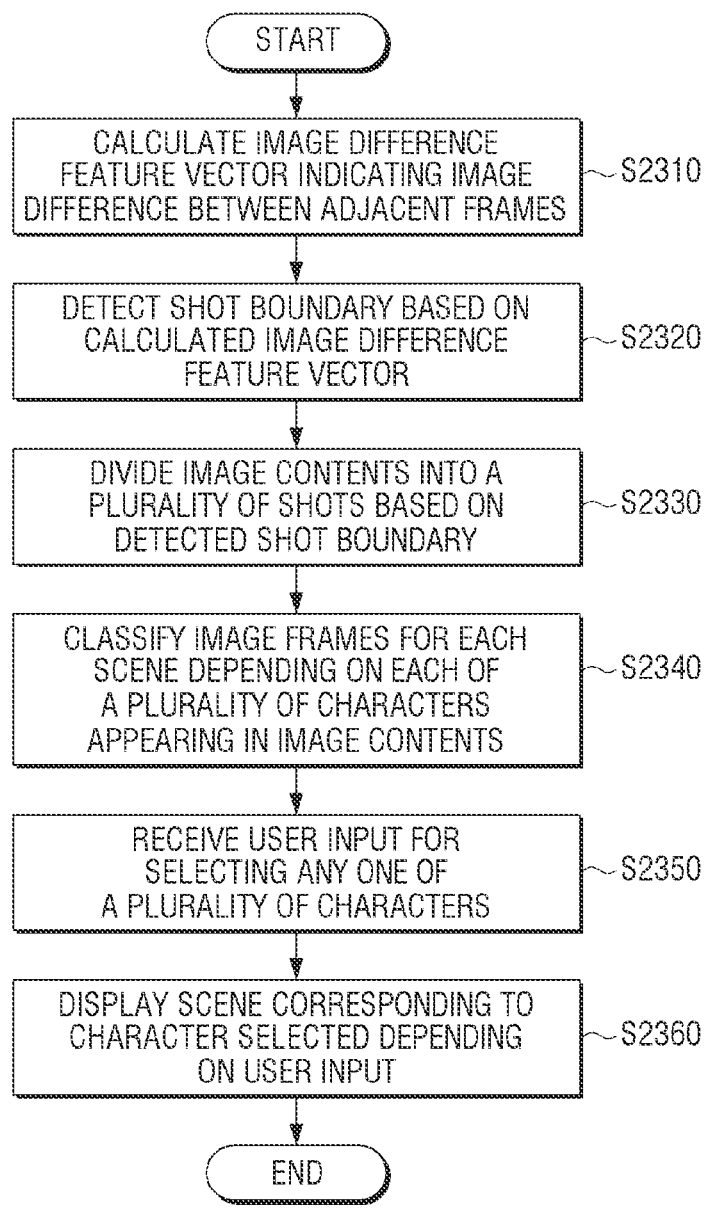

Referring to FIG. 23, a method for providing image contents according to another example embodiment may include determining, e.g., by calculating, an image difference feature vector indicating an image difference between adjacent frames (S2310), detecting a shot boundary based on, for example, a calculated image difference feature vector (S2320), dividing the image contents into a plurality of shots based on the detected shot boundary (S2330), classifying image frames for each scene depending on each of a plurality of characters appearing in the image contents (S2340), receiving a user input for selecting any one of the plurality of characters (S2350), and displaying a scene corresponding to the character selected based on the user input (S2360).

Here, the shot boundary may be detected using a machine studying algorithm.

In addition, dividing of the image contents into a plurality of shots may include generating shot feature vectors including, for example, at least one of shot start time information indicating start time information of each of the plurality of shots, image feature values of a plurality of image frames included in one shot, and audio feature values of the plurality of image frames included in one shot with respect to each of the plurality of shots and grouping the plurality of shots into one scene based on a similarity between the generated shot feature vectors.

Here, in the grouping, in the case in which a similarity between a first shot feature vector and an n-th shot feature vector is greater than or equal to a preset value, all shots from a first shot to an n-th shot may be grouped into the same scene.

Figure 24:
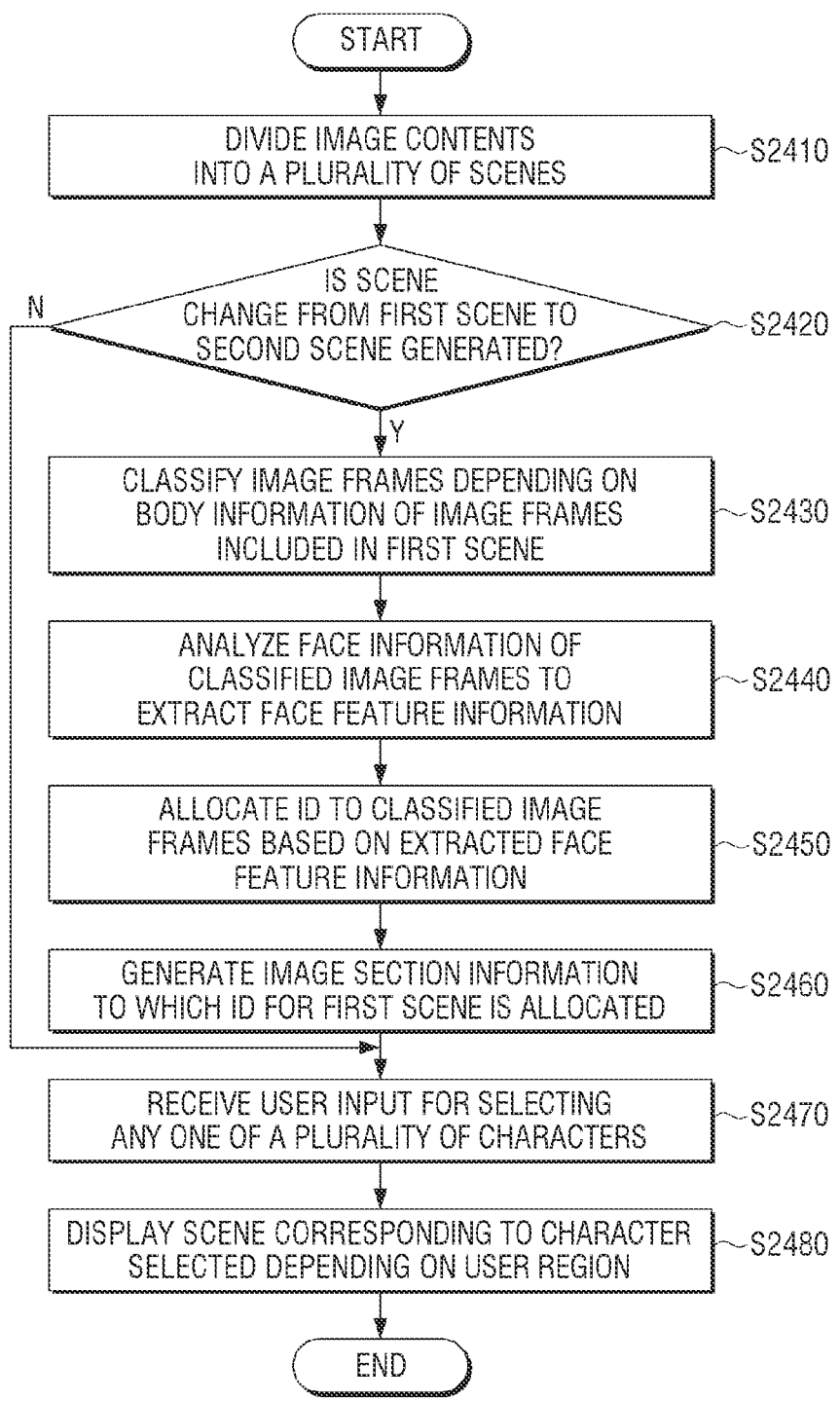

Referring to FIG. 24, a method for providing image contents according to still another example embodiment includes dividing the image contents into a plurality of scenes, each scene including a plurality of shots (S2410), classifying image frames depending on body information of the image frames included in a first scene (S2430) when a scene change from the first scene to a second scene is generated (S2420-Y), analyzing face information of the classified image frames to extract face feature information (S2440), allocating an ID to the classified image frames based on the extracted face feature information (S2450), and generating image section information to which the ID for the first scene is allocated (S2460). In addition, the method for providing image contents according to still another example embodiment further includes receiving a user input for selecting any one of the plurality of characters (S2470), and displaying a scene corresponding to the character selected based on the user input (S2480).

Here, the face feature information may include at least one face feature vector.

In addition, in the allocating of the ID, an ID having face feature information matched to the extracted face feature information may be allocated to the classified image frames.

Further, in the classifying of the image frames, the image frames may be classified further using audio information.

Figure 25:
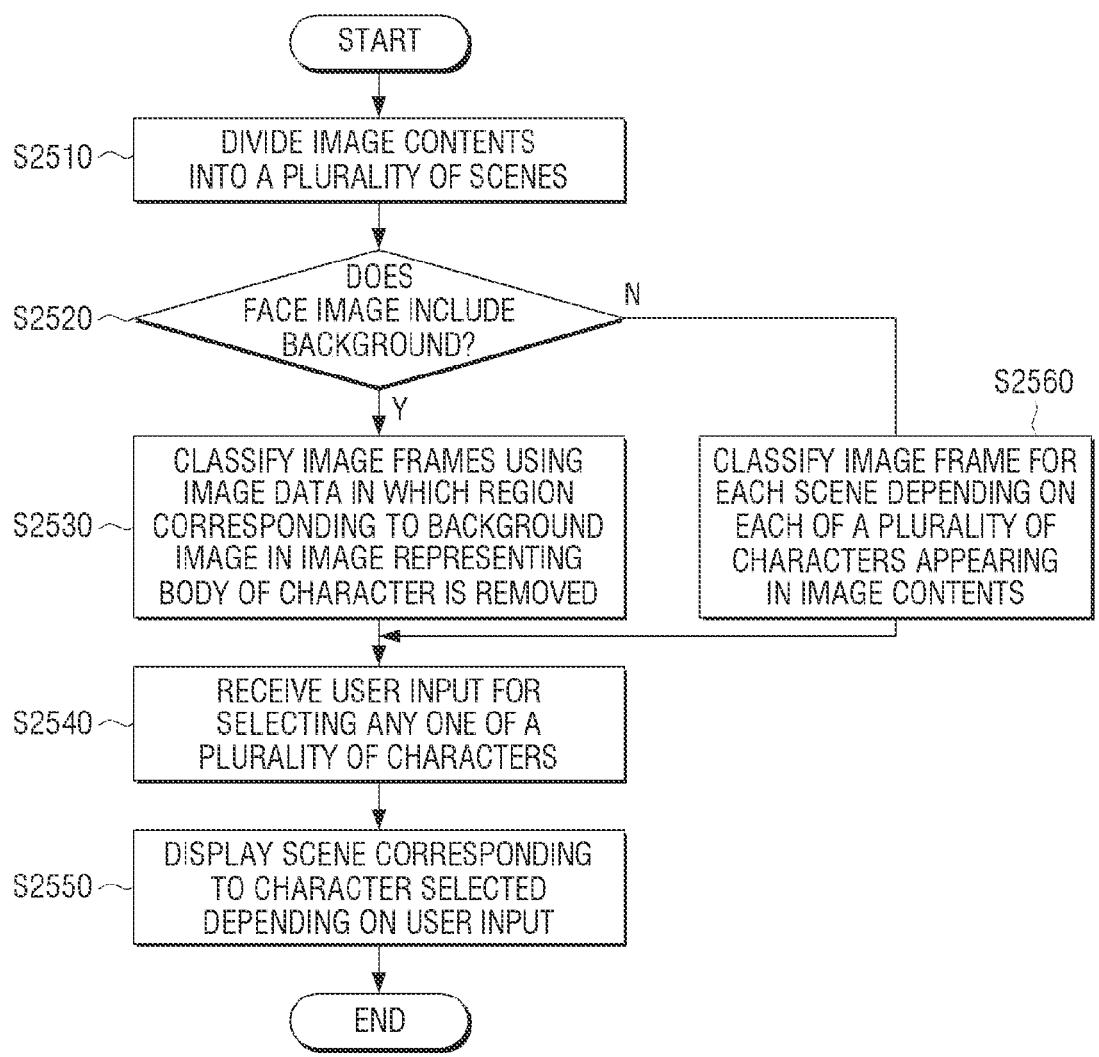

Referring to FIG. 25, a method for providing image contents according to still another example embodiment includes dividing the image contents into a plurality of scenes, each scene including a plurality of shots (S2510) and classifying image frames using image data in which a region corresponding to a background image in an image representing a body of a character is removed (S2530) in the case in which an image representing a face of the character included in the image frames includes the background image (S2520-Y).

In addition, the method for providing image contents according to still another example embodiment further includes receiving a user input for selecting any one of the plurality of characters (S2540), and displaying a scene corresponding to the character selected based on the user input (S2550).

For example, the method for providing image contents may further include generating an image in which the region corresponding to the background image in the image representing the body of the character is removed in the case in which the image representing the face of the character included in the image frames includes the background image, comparing a similarity between the character included in the generated image and a character of the already classified group, and allowing the generated image to be included in the already classified group in the case in which the similarity is greater than or equal to a preset value.

Here, in the comparing of the similarity, a color histogram of an image of the character included in the generated image and a color histogram of the character of the already classified group may be compared with each other.

Figure 26:
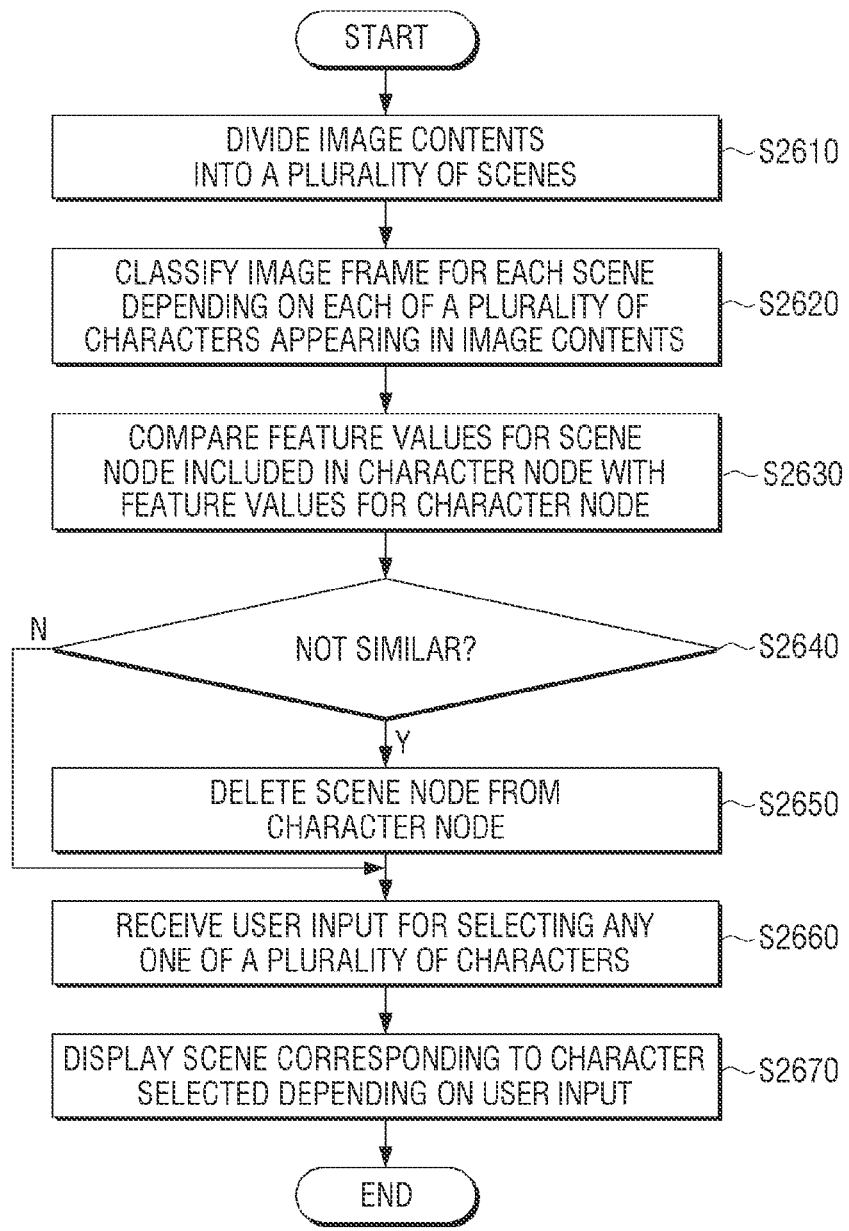

Referring to FIG. 26, a method for providing image contents according to still another example embodiment includes dividing the image contents into a plurality of scenes, each scene including a plurality of shots (S2610), classifying image frames for each scene depending on each of a plurality of characters appearing in the image contents (S2620), comparing feature values for a scene node included in a character node with feature values for the character node (S2630), and deleting the scene node from the character node (S2650) when it is determined that the nodes are not similar (S2640-Y) based on the comparison. In addition, the method for providing image contents according to still another example embodiment further includes receiving a user input for selecting any one of the plurality of characters (S2660), and displaying a scene corresponding to the character selected depending on the user input (S2670).

As described above, and will be appreciated by those skilled in the art, the described systems, methods and techniques may be implemented in digital electronic circuitry including, for example, electrical circuitry, logic circuitry, hardware, computer hardware, firmware, software, or any combinations of these elements. Apparatus embodying these techniques may include appropriate input and output devices, a computer processor, and a computer program product tangibly embodied in a non-transitory machine-readable storage device or medium for execution by a programmable processor. A process embodying these techniques may be performed by a programmable hardware processor executing a suitable program of instructions to perform desired functions by operating on input data and generating appropriate output. The techniques may be implemented in one or more computer programs that are executable on a programmable processing system including at least one programmable processor coupled to receive data and instructions from, and transmit data and instructions to, a data storage system, at least one input device, and at least one output device. Each computer program may be implemented in a high-level procedural or object-oriented programming language or in assembly or machine language, if desired; and in any case, the language may be compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; Compact Disc Read-Only Memory (CD-ROM), digital versatile disk (DVD), Blu-ray disk, universal serial bus (USB) device, memory card, or the like. Any of the foregoing may be supplemented by, or incorporated in, specially designed hardware or circuitry including, for example, application-specific integrated circuits (ASICs) and digital electronic circuitry. Thus, methods for providing image contents described above may be implemented by a program including an executable algorithm that may be executed in a computer, and the program may be stored and provided in a non-transitory computer readable medium.

Next, example GUIs according to various example embodiment will be described.

FIGS. 27A and 27B are views illustrating an example character selecting screen according to an example embodiment. FIG. 27A illustrates an example of a character summary mode operation screen. In the case in which a user wants to view a scene or a shot for each character during a period in which image contents are reproduced or after the reproduction of the image contents is completed, a character summary mode may be requested. The request of the character summary mode may be input, for example, through a remote controller or the input unit 130 of the apparatus 100 for providing image contents. For example, the user may request the character summary mode by selecting a character summary mode menu displayed on one region of a display screen of the apparatus 100 for providing image contents during the period in which the image contents are reproduced or after the reproduction of the image contents is completed. Here, the character summary mode menu may, for example, have an icon form displayed on one region of the display screen or an OSD menu form. However, the character summary mode menu is not limited thereto, but may be implemented in all forms in which a specific function may be executed by selection of the user, such as a key form included in the remote controller, and the like.

The user may enter the character summary mode as described above during the period in which the image contents are reproduced or after the reproduction of the image contents is completed, thereby viewing a scene or a shot for each character within the corresponding contents. Here, extraction of the scene or the shot for each character may be performed by the above-mentioned methods and be performed before or after the request of the character summary mode. For example, as illustrated in (a) of FIG. 27A, the apparatus 100 for providing image contents may display a selectable character thumbnail display screen 2710 based on a result analyzed by the above-mentioned method with respect to contents that are being reproduced or contents of which reproduction is completed in the character summary mode. In this case, a screen 2720 for displaying a scene or a shot for the selected character may be displayed together with the selectable character thumbnail display screen 2710.

Meanwhile, in the character summary mode, a range of the number of selectable characters may be adjusted, and selection for a representative character in the image contents or all characters included in the image contents may be made. Here, as an example of classifying the representative character in the image contents, scenes for each character in the corresponding image contents are extracted, the number of scenes is counted, and a character for which the number of scenes is an appropriate number or more may be classified as the representative character in the image contents.

In addition, since each character node may include feature values for an age and a sex, as described above with reference to FIGS. 19 to 21, the apparatus 100 for providing image contents may classify a character matched to a reference for an age or a sex set by the user as the representative character in the image contents. Thumbnails of the representative character in the image contents classified as described above or all characters may be displayed on the character thumbnail display screen 2710.

Therefore, when a specific character thumbnail 2730 is selected in the character thumbnail display screen 2710, at least one scene or shot for the selected character may be displayed on another region 2720 of the screen. Here, when the specific character thumbnail 2730 is selected, at least one scene or shot for the selected character may be automatically reproduced continuously on another region 2720 of the screen. However, the present disclosure is not limited thereto. For example, when the specific character thumbnail 2730 is selected, the selected character thumbnail 2730 may be enlarged and displayed on another region 2720 of the screen, and when the user again selects another region 2720 of the screen, the scene or the shot may be reproduced. That is, in this case, all screens or shots in which the selected character appears may be continuously displayed.

Meanwhile, according to another example embodiment, the apparatus 100 for providing image contents may separately display a plurality of scenes or shots for the selected character and display a specific scene or shot selected by the user among the plurality of scenes or shots that are separately displayed.

For example, when a user command requesting separate display of the scenes or the shots for the selected character is input, a thumbnail display screen 2740 of each of the plurality of scenes or shots for the selected character may be displayed, and a scene selected by a user input or a scene or a shot corresponding to a shot thumbnail 2750 among the plurality of scenes or shots may be displayed on one region 2720 of the screen, as illustrated in (b) of FIG. 27A. Here, the user command requesting separate display of the scenes or the shots for the selected character may be an operation of again selecting the specific character thumbnail 2730 selected once in (a) of FIG. 27A, but is not limited thereto.

Meanwhile, additional information such as start times and reproduction times of the scenes or the shots may be displayed on each of detailed scene or shot thumbnails illustrated in the thumbnail display screen 2740 to promote convenience of the user at the time of selecting the scene or the shot. In addition, when a user command for returning from an operation screen on which the scenes or the shots for the selected character are separately displayed as illustrated in (b) of FIG. 27A to the previous screen is input, the operation screen may return to a screen on which thumbnails for each character are displayed as illustrated in (a) of FIG. 27A.

Meanwhile, the user may perform various settings for the character summary mode operation. For example, the user may set the character summary mode through a character summary mode setting UI displayed on a screen of the apparatus 100 for providing image contents. FIG. 27B illustrates an example of a character summary mode setting UI displayed on a display screen 2700 of the apparatus 100 for providing image contents.

As illustrated in (a) of FIG. 27B, the character summary mode setting UI may include a screen configuration menu 2701 for setting a screen configuration of the character summary mode and a representative character selecting menu 2702 for setting a reference for selecting a representative character.

The user may set the number of characters that may be selected in the character summary mode. For example, the user may set the number of characters in the screen configuration menu 2701 to set the number of characters that are to be displayed in the character thumbnail display screen 2701-1. For example, in the case in which the number of characters 2701-1 is 5 as illustrated in (a) of FIG. 27B, five character thumbnails are displayed on the character thumbnail display screen 2710, as illustrated in (a) of FIG. 27A, and the user selects a character for which a scene or a shot is wanted to be viewed by him/her among the five characters.

In addition, the user may select a screen layout 2701-2 in the screen configuration menu 2701 to set layouts of a region in which thumbnails for each character are to be displayed and a region in which a scene or a shot for the selected character is to be displayed in an entire screen 2700. For example, when the user selects the screen layout 2701-2 in (a) of FIG. 27B, a screen as illustrated in (b) of FIG. 27B displaying a screen layout that may be selected by the user may be displayed.

Therefore, when the user selects a screen layout 2703, a screen of a layout as illustrated in FIG. 27A may be displayed. In the case in which the user selects a screen layout 2704 to set the screen layout, at the time of the character summary mode operation, thumbnails for each character are displayed on the right of the screen 2700, and a scene or a shot for the selected character is displayed on the left of the screen 2700. Meanwhile, an example of setting the screen layout is not limited thereto. That is, an example embodiment in which the user directly selects and sets a region in which the thumbnails for each character are to be displayed is possible.

Meanwhile, the user may set a reference for selecting the representative character. For example, the user may set the reference for selecting the representative character among all characters included in the image contents using a representative character selecting menu 2702 of (a) of FIG. 27B. For example, the user may set at least one of the number of scenes for each character, a sex, and an age as the reference for selecting the representative character.

For example, the user may set the reference for selecting the representative character by setting a preset number through a menu 2702-1 for setting the number of scenes in the representative character selecting menu 2702 of (a) of FIG. 27B. Therefore, the apparatus 100 for providing image contents may count the number of scenes for each character in the image contents and classify or select a character for which the number of scenes is greater than or equal to a preset number as the representative character. In the case in which the number of scenes is set to 10 as illustrated in (a) of FIG. 27B, characters for which the counted number of scenes is 10 or more may be selected as the representative character in the corresponding image contents and be displayed on the thumbnail display region more preferentially as compared with other characters.

In addition, the user may, for example, set the reference for selecting the representative character by setting an age or a sex through a menu 2702-2 for setting an age or a menu 2702-3 for setting a sex in the representative character selecting menu 2702 of (a) of FIG. 27B. Therefore, the apparatus 100 for providing image contents may, for example, classify or select a character matched to an age or sex reference set by the user among all characters in the image contents as the representative character. In the case in which an age is set to "twenty five year old or less" and a sex is set to "male" as illustrated in (a) of FIG. 27B, a characters matched to a twenty five year old or less male among the characters included in the image contents may be selected as the representative character and be displayed on the thumbnail display region more preferentially as compared with other characters. However, this is only an example, and the reference for selecting the representative character may be set in various forms using the age or the sex. For example, a reference such as "20s male", "50s", or "female" may be set, and a character matched to the reference may be classified as the representative character.

As described above, the user may select any one of the thumbnails for each character in the contents through the character summary mode to view the scene or the shot of the desired character. In addition, the user may perform setting for an operation and a screen configuration of the character summary mode.

Meanwhile, although the case in which the thumbnails for each character selectable in the character summary mode are displayed on one region 2710 of the display screen has been described by way of example hereinabove, the present disclosure is not limited thereto. That is, an example embodiment in which reproduction screens of scenes or shots for each character rather than the thumbnails are displayed on region 2710 of the display screen and are selected by the user is possible.

Figure 28:
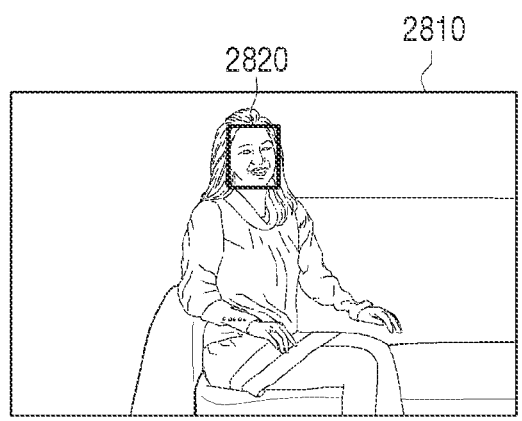
FIG. 28 is a view illustrating a character selecting screen according to another example embodiment.

FIG. 28 is a view illustrating a character selecting screen according to another example embodiment. As illustrated in FIG. 28, the user may directly select a character appearing on contents (e.g., PVR or VOD) that are currently being reproduced. In this case, a user input for selecting the character on a screen 2810 in which a desired character appears is received. Here, example means for selecting the character may include a method of receiving a selection input from a remote controller, audio recognition of the user, operation recognition of the user, a button input method of the apparatus 100 for providing image contents, and the like.

For example, when a specific button of the remote controller is pressed, a guide line 2820 as illustrated in FIG. 28 is marked in at least one character included a current screen, a highlighted guide line 2820 is changed through a direction button of the remote controller, and a character corresponding to the highlighted guide line 2820 is selected when a selection input is input through the remote controller, thereby detecting a scene or a shot for the selected character. Alternatively, scene or shot information detected in advance may be displayed.

In the case of the audio recognition, when an audio such as "find his/her scene" or "find that person's scene" is input, the audio recognition is performed through an audio recognizing module, at least one character is identified, the guide line 2820 is marked in the character, and a user audio "end of the top of the right" is recognized, such that a character corresponding to the guide line 2820 positioned, for example, at the end of the top of the right of the screen is selected. When the character is selected, a scene or a shot for the selected character is detected. Alternatively, scene or shot information detected in advance is displayed. The user may also select a specific character by, for example, pointing a character in a screen using a finger or a user object in a current screen.

The user may select a plurality of characters, and as illustrated in FIGS. 27A and 27B described above, the plurality of characters may be shown through a character summary mode screen and a scene or a shot for the selected specific character may be reproduced in the same scheme as the character summary mode.

In the method as described above, particularly, in the case in which the user viewing an advertisement, or the like, selects a character appearing the advertisement, the apparatus 100 for providing image contents searches for image contents for the selected character, extracts a scene or a shot in the searched image contents, and displays the extracted scene or shot.

Figure 29B:
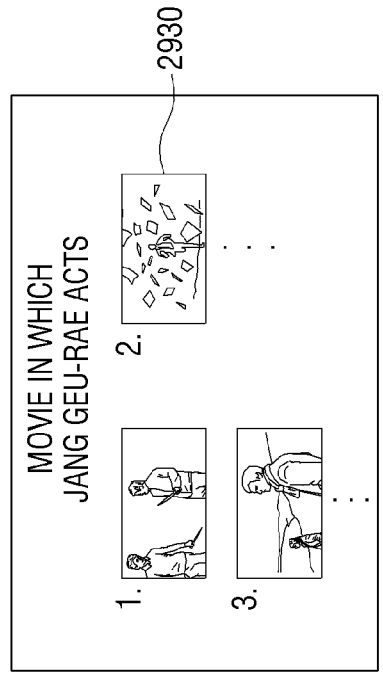
FIGS. 29A and 29B are views illustrating a character selecting screen according to still another example embodiment.
Figure 29A:
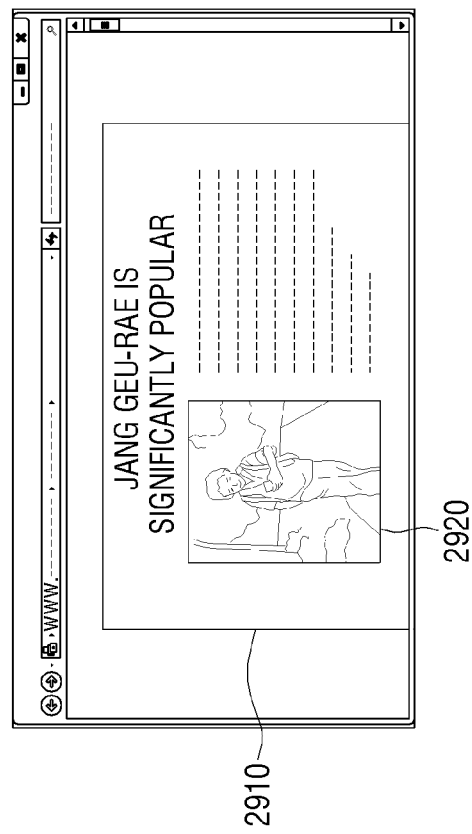

FIGS. 29A and 29B are views illustrating a character selecting screen according to still another example embodiment. According to an example embodiment, a terminal apparatus (not illustrated) may receive image contents from, for example, a web server and display the image contents. In this case, the terminal apparatus requests the web server to detect the scene and the shot as described above, and the web server is operated like the apparatus 100 for providing image contents as described above to provide a detection result of the scene or the shot to the terminal apparatus. The terminal apparatus displays a provided image.

FIGS. 29A and 29B are an execution scenario in this case. The user may read an article 2910 for a specific actor while surfing the web, as illustrated in FIG. 29A. Here, the user may want to search image contents in which the actor in the article 2910 appears. The user selects an actor included in an image 2920 appended to the article by the above-mentioned method. That is, the user selects the actor discussed in the article through an input apparatus (by, for example, clicking or touching an article photograph using a mouse) or through audio recognition or gesture recognition. In this case, the terminal apparatus transmits, for example, meta information (or image information) on the selected actor (character) to the web server. The web server searches the image contents in which the actor appears as described above.

FIG. 29B is a screen displaying a list 2930 of image contents in which an actor 'Jang Geu-rae' appears. The web server provides the list 2930 of the image contents to the terminal apparatus, and the terminal apparatus displays the image contents list. The user may select image contents that the user wants to view. As a selection method, the above-mentioned method may be used.

When the image contents are selected, the web server detects a scene or a shot in which the actor 'Jang Geu-rae' appears from the selected image contents by the above-mentioned method, and transfers a thumbnail image of the detected scene or shot, as illustrated in FIGS. 27A and 27B. The user may select a desired scene or shot through the terminal apparatus, and receive streaming from the web server to reproduce the image contents.

In the case in which the user performs a search by inputting an actor name or a character name as a text, the web server may also provide the image contents in which an actor or a character appears, as illustrated in FIG. 29B, by performing a text search query. The user may select the image contents by the above-mentioned method, and the scene or the shot of the selected image contents may be detected and provided to the user terminal apparatus by streaming.

Figure 30:
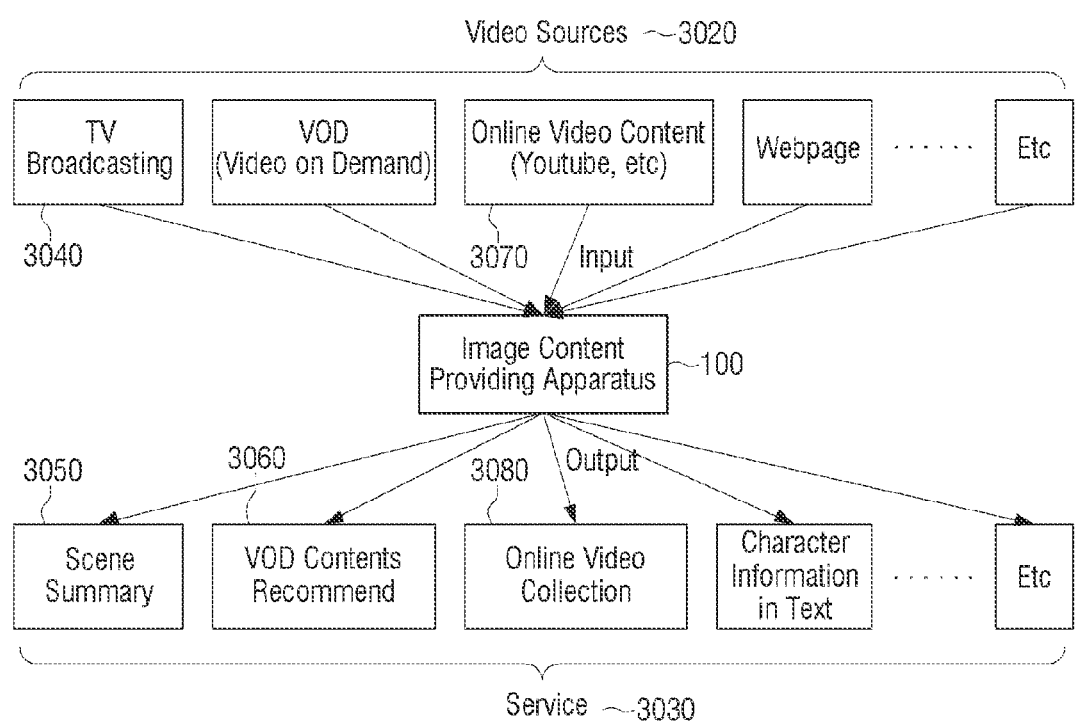
FIG. 30 is a view of a image contents providing service according to an example embodiment.

FIG. 30 is a view of an image contents providing service according to an example embodiment. As illustrated in FIG. 30, the apparatus 100 for providing image contents may provide various services 3030 to a user terminal apparatus (not illustrated) using character information recognized from various image information sources 3020 such as television (TV) broadcast/VOD/online image contents, and the like.

For example, the apparatus 100 for providing image contents may not only provide a classification scene 3050 for each character, which is a basic providing service of the image contents, from TV broadcasting 3040 to the user, but also search a face image of a classified character on an on-line service (e.g., web) to recognize character information and recommend 3060 works of the corresponding character in VOD contents to the user based on the recognized information.

In addition, the apparatus 100 for providing image contents may collect 3080 image information on the character in a corresponding program in the on-line image contents 3070 using the recognized character information and program information extracted from an electronic program guide (EPG) and provide the collected image information to the user. As described above, the web server may perform a role of the apparatus 100 for providing image contents, and a final service may be provided through the user terminal apparatus. In addition, each contents source may provide services through individual servers. In this case, the apparatus for providing image contents may perform a role of a relay server.

Figure 31:
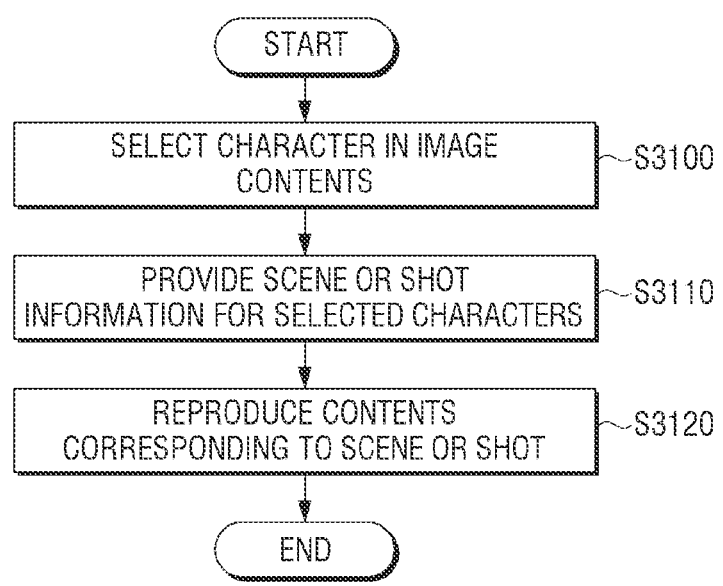
FIG. 31 is a flow chart of a method for reproducing image contents according to an example embodiment.

FIG. 31 is a flow chart illustrating a method for reproducing image contents according to an example embodiment. Referring to FIG. 31, a method for reproducing image contents according to an example embodiment includes selecting a character in the image contents (S3110), providing scene or shot information on the selected character (S3120), and reproducing contents corresponding to a scene or a shot (S3130). Since each step has been described above, an overlapped description will be omitted.

As described above, according to various example embodiments, a method and an apparatus for providing image contents capable of dividing contents based on scenes and effectively providing an image for a character of the contents depending on the divided scenes are provided.

Although example embodiments have been illustrated and described in detail hereinabove, the present disclosure is not limited to the above-mentioned specific example embodiments, but may be modified by those skilled in the art to which the present disclosure pertains without departing from the scope and spirit as disclosed in the accompanying claims.

What is claimed is:

1. A method for providing image contents, comprising:
dividing image contents into a plurality of scenes, each scene including a plurality of shots;
classifying image frames for each scene depending on at least one of a plurality of characters appearing in the image contents;
receiving a user input for selecting any one of the plurality of characters;
generating for display a scene corresponding to the character selected;
comparing feature values for a scene node included in a character node with feature values for the character node in determining a similarity value; and
deleting the scene node from the character node based on the similarity value.

2. The method for providing image contents as claimed in claim 1, wherein dividing of the image contents into the plurality of scenes comprises:
determining an image difference feature vector indicating an image difference between adjacent frames;
detecting a shot boundary based on the image difference feature vector; and
dividing the image contents into the plurality of shots based on the detected shot boundary.

3. The method for providing image contents as claimed in claim 2, wherein in the detecting of the shot boundary, the shot boundary is detected using a machine studying algorithm.

4. The method for providing image contents as claimed in claim 2, wherein dividing of the image contents into the plurality of shots comprises:
generating shot feature vectors including at least one of a shot start time information indicating start time information of each of the plurality of shots, image feature values of a plurality of image frames included in one shot, and audio feature values of the plurality of image frames included in one shot with respect to each of the plurality of shots; and grouping the plurality of shots into one scene based on a similarity of the generated shot feature vectors.

5. The method for providing image contents as claimed in claim 4, wherein said grouping comprises all shots from a first shot to an n-th shot being grouped into the same scene when a similarity between a first shot feature vector and an n-th shot feature vector is greater than or equal to a preset value.

6. The method for providing image contents as claimed in claim 1, wherein the classifying of the image frames comprises:
    classifying the image frames depending on body information of the image frames included in a first scene when a scene change from the first scene to a second scene is generated;
    extracting face feature information by analyzing face information of the classified image frame;
    allocating an ID to the classified image frames based on the extracted face feature information; and
    generating image section information to which the ID for the first scene is allocated.

7. The method for providing image contents as claimed in claim 6, wherein the face feature information includes at least one face feature vector.

8. The method for providing image contents as claimed in claim 6, wherein said allocating comprises assigning an ID having face feature information matched to the extracted face feature information to the classified image frames.

9. The method for providing image contents as claimed in claim 6, wherein classifying the image frames comprises further classifying the image frames using audio information.

10. The method for providing image contents as claimed in claim 1, wherein in the case in which an image representing a face of the character included in the image frames includes a background image, the image frames are classified using image data in which a region corresponding to the background image in an image representing a body of the character is removed.

11. The method for providing image contents as claimed in claim 1, further comprising:
    generating an image in which a region corresponding to a background image in an image representing a body of the character is removed in the case in which an image representing a face of the character included in the image frames includes the background image;
    comparing the character included in the generated image and a character of the already classified group to determine a similarity value; and
    including the generated image in the already classified group in the case in which the similarity value is greater than or equal to a preset value.

12. The method for providing image contents as claimed in claim 11, wherein said comparing comprises comparing a color histogram of an image of the character included in the generated image and a color histogram of the character of the already classified group to each other.

13. An apparatus for providing image contents, comprising:
    scene configuring circuitry configured to divide the image contents into a plurality of shots, generate a shot feature vector with respect to each of the plurality of shots, and group the plurality of shots into a plurality of scenes based on a similarity of the generated shot feature vectors;
    classifying circuitry configured to classify image frames for each scene depending on each of a plurality of characters appearing in the image contents;
    input circuitry configured to receive a user input for selecting any one of the plurality of characters; and
    a display configured to display a scene corresponding to the selected character.

14. The apparatus for providing image contents as claimed in claim 13, wherein the scene configuring circuitry is configured to determine an image difference feature vector indicating an image difference between adjacent frames, detect a shot boundary based on the calculated image difference feature vector, and divide the image contents into the plurality of shots based on the detected shot boundary.

15. The apparatus for providing image contents as claimed in claim 14, wherein the scene configuring circuitry is configured to detect the shot boundary using a machine studying algorithm.

16. The apparatus for providing image contents as claimed in claim 13, wherein the short feature vector comprises at least one of shot start time information indicating start time information of each of the plurality of shots, image feature values of a plurality of image frames included in one shot, and audio feature values of the plurality of image frames included in one shot.

17. The apparatus for providing image contents as claimed in claim 13, wherein the scene configuring circuitry is configured to group all shots from a first shot to an n-th shot into the same scene in the case in which a similarity between a first shot feature vector and an n-th shot feature vector is greater than or equal to a preset value.

18. The apparatus for providing image contents as claimed in claim 13, wherein the classifying circuitry comprises:
    body recognizing circuitry configured to classify the image frames depending on body information of the image frames included in a first scene when a scene change from the first scene to a second scene is generated;
    face recognizing circuitry configured to analyze face information of the classified image frames to extract face feature information;
    ID allocating circuitry configured to assign an ID to the classified image frames based on the extracted face feature information; and
    image section information generating circuitry configured to generate image section information to which the ID for the first scene is assigned.

19. The apparatus for providing image contents as claimed in claim 18, wherein the face feature information includes at least one face feature vector.

* * * * *